(12) United States Patent
Ziemer et al.

(10) Patent No.: US 10,112,473 B2
(45) Date of Patent: Oct. 30, 2018

(54) TRANSMISSION, HYBRID DRIVETRAIN AND DRIVETRAIN FOR AN ELECTRIC VEHICLE

(71) Applicant: ZF Friedrichshafen AG, Friedrichshafen (DE)

(72) Inventors: Peter Ziemer, Tettnang (DE); Raffael Kuberczyk, Ravensburg (DE); Christian Sibla, Eriskirch (DE); Andreas Beisswenger, Aulendorf (DE); Eckehard Münch, Bünde (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 221 days.

(21) Appl. No.: 15/102,147

(22) PCT Filed: Nov. 6, 2014

(86) PCT No.: PCT/EP2014/073867
§ 371 (c)(1),
(2) Date: Jun. 6, 2016

(87) PCT Pub. No.: WO2015/082162
PCT Pub. Date: Jun. 11, 2015

(65) Prior Publication Data
US 2016/0375753 A1    Dec. 29, 2016

(30) Foreign Application Priority Data
Dec. 6, 2013  (DE) .................. 10 2013 225 210

(51) Int. Cl.
*F16H 3/72*    (2006.01)
*B60K 6/365*   (2007.10)
(Continued)

(52) U.S. Cl.
CPC .............. *B60K 6/365* (2013.01); *B60K 6/445* (2013.01); *B60K 6/48* (2013.01); *B60K 6/547* (2013.01);
(Continued)

(58) Field of Classification Search
CPC ........ B60K 6/365; B60K 6/547; B60K 6/445; B60K 6/50; F16H 3/66; F16H 3/725; Y10T 477/33
See application file for complete search history.

(56) References Cited

U.S. PATENT DOCUMENTS

2007/0129196 A1   6/2007   Bucknor et al.
2007/0184927 A1   8/2007   Cho
(Continued)

FOREIGN PATENT DOCUMENTS

DE   102004042007 A1   3/2006
DE   102006044894 A1   4/2008
(Continued)

OTHER PUBLICATIONS

German Search Report DE102013225210.2, dated Aug. 25, 2014. (10 pages).
(Continued)

*Primary Examiner* — Mark J Beauchaine
(74) *Attorney, Agent, or Firm* — Dority & Manning, P.A.

(57) ABSTRACT

A transmission includes a main gear set, an auxiliary gear set and an electric motor with a rotor and a stator. A third shaft of the main gear set is connected to the transmission output shaft, and a first shaft of the auxiliary gear set is connected to the rotor. When a second shaft of the main gear set is constantly connected to a second shaft of the auxiliary gear set, the third shaft of the main gear set or a fourth shaft of the main gear set is constantly connected to the third shaft of the auxiliary gear set. When the third shaft of the main
(Continued)

gear set is constantly connected to the second shaft of the auxiliary gear set, the fourth shaft of the main gear set is constantly connected to the third shaft of the auxiliary gear set.

16 Claims, 13 Drawing Sheets

(51) Int. Cl.
*B60K 6/445* (2007.10)
*B60K 6/48* (2007.10)
*B60K 6/547* (2007.10)
*F16H 3/66* (2006.01)

(52) U.S. Cl.
CPC .............. *F16H 3/66* (2013.01); *F16H 3/725* (2013.01); *B60Y 2300/70* (2013.01); *F16H 2200/006* (2013.01); *F16H 2200/0021* (2013.01); *F16H 2200/0043* (2013.01); *F16H 2200/0073* (2013.01); *F16H 2200/201* (2013.01); *F16H 2200/2012* (2013.01); *F16H 2200/2015* (2013.01); *F16H 2200/2041* (2013.01); *F16H 2200/2046* (2013.01); *Y02T 10/6221* (2013.01); *Y02T 10/6239* (2013.01); *Y10S 903/911* (2013.01); *Y10S 903/918* (2013.01)

(56) References Cited

U.S. PATENT DOCUMENTS

| | | |
|---|---|---|
| 2008/0171625 A1 | 7/2008 | Goldschmidt et al. |
| 2009/0098968 A1* | 4/2009 | Maguire ................ B60K 6/365 475/5 |
| 2013/0196809 A1 | 8/2013 | Ziemer |

FOREIGN PATENT DOCUMENTS

| | | |
|---|---|---|
| DE | 102008051305 A1 | 12/2009 |
| DE | 102012201377 A1 | 8/2013 |

OTHER PUBLICATIONS

International Search Report (English Translation) PCT/EP2014/073867, dated Feb. 3, 2015. (3 pages).

* cited by examiner

| GEAR | C | B | D | E | A | F | EM | RATIO | GEAR STEP |
|---|---|---|---|---|---|---|---|---|---|
| 1VM +Parking Lock | | ● | | | | ● | M/Rek | 6.51 | |
| 2VM | | ● | ● | | | ● | M/Rek | 3.97 | 1.64 |
| 3VM | | | ● | | | | M/Rek | 2.55 | 1.56 |
| 4VM | | | ● | ● | | | M/Rek | 1.64 | 1.55 |
| 5VM | | ● | | ● | | | M/Rek | 1.31 | 1.25 |
| 6VM | | | | ● | ● | | M/Rek | 1.00 | 1.31 |
| 7VM | | | | | ● | | M/Rek | 0.75 | 1.34 |
| 8VM | ● | | | | ● | | M/Rek | 0.64 | 1.16 |
| 1EM | | | | | | ● | M/Rek | 2.39 | |
| 1S | | ● | | | | (●)* | EM | | |
| 2S | | | | ● | | (●)* | EM | | |

* Slow Start  
Overall Gear Ratio: 10.1

Fig. 3

| GEAR | C | B | D | E | A | F | EM | RATIO | GEAR STEP |
|---|---|---|---|---|---|---|---|---|---|
| 1VM | ● | | | | | | M/Rek | 7.50 | |
| 2VM | | ● | | | | ● | M/Rek | 3.75 | 2.00 |
| 3VM | | | | | | ● | M/Rek | 2.50 | 1.50 |
| 4VM | | ● | ● | | | ● | M/Rek | 1.88 | 1.33 |
| 5VM | ● | | ● | | | | M/Rek | 1.50 | 1.25 |
| 6VM | | | ● | | ● | | M/Rek | 1.25 | 1.20 |
| 7VM | ● | | | | ● | | M/Rek | 1.07 | 1.17 |
| 8VM | | ● | | | ● | | M/Rek | 0.94 | 1.14 |
| 9VM | | | | ● | | | M/Rek | 0.83 | 1.12 |
| 10VM | | | | ● | | | M/Rek | 0.75 | 1.11 |
| 11VM | | ● | | ● | | | M/Rek | 0.68 | 1.10 |
| 1EM | | | | | | ● | M/Rek | Fig.4: 5,83 Fig.7: 4,00 | |
| 1S | | ● | | | | | EM/SG | | |
| 2S | ● | | | | | ● | EM/SG | | |

Overall Gear Ratio: 11.0

Fig. 6

| GEAR | A | C | D | E | EM | RATIO | GEAR STEP |
|---|---|---|---|---|---|---|---|
| 1VM +Parking Lock | ● | | | | M/Rek | 3.80 | |
| 2VM | ● | ● | ● | | M/Rek | 1.88 | 2.03 |
| 3VM | ● | ● | | ● | M/Rek | 1.00 | 1.88 |
| 4VM | | ● | ● | ● | M/Rek | 0.69 | 1.45 |
| 1EM | ● | | ● | | M/Rek | 6.60 | |
| 1S | ● | | ● | | EM/SG | | Overall Gear Ratio: 5.5 |
| 2S | | ● | ● | | EM/SG with Parking Brake | | Overall Gear Ratio with E-Gear: 9.6 |
| Parking Brake | | | | | | | |

Fig. 11

TRANSMISSION, HYBRID DRIVETRAIN AND DRIVETRAIN FOR AN ELECTRIC VEHICLE

FIELD OF THE INVENTION

The invention relates generally to a transmission with a transmission input shaft and a transmission output shaft, a main gear set, an auxiliary gear set, and an electric motor with a rotor and a stator, whereas the transmission comprises at least one power path between the transmission input shaft and the main gear set, whereas the main gear set features a first and a second planetary gear set with a total of four shafts designated in the order of rotational speeds as the first, second, third and fourth shafts, whereas the at least one power path is connectable through at least one shift element to at least one of the four shafts of the main gear set, whereas the third shaft of the main gear set is connected to the transmission output shaft, and whereas the auxiliary gear set features a planetary gear set with a first, second and third shaft, whereas the first shaft of the auxiliary gear set is connected to the rotor. The invention also relates generally to a drive train for a motor vehicle with a transmission.

BACKGROUND

Herein, a transmission in particular designates a multi-speed transmission, with which a predetermined number of gears, thus fixed transmission ratio relationships between a transmission input shaft and a transmission output shaft, are automatically shiftable by shift elements. The shift elements here are comprised of clutches or brakes, for example. Such transmissions are primarily used in motor vehicles to adjust the rotational speed and torque output capabilities of the drive unit to the driving resistance of the motor vehicle in a suitable manner.

From patent application DE 10 2012 201 377 A1 of the applicant, a transmission with a transmission input shaft and a transmission output shaft, and two power paths between the transmission input shaft and a main gear set with two individual planetary gear sets, with four shafts designated in the order of rotational speeds as the first, second, third and fourth shafts is known, whereas the third shaft of the four shafts is connected to the transmission output shaft. An electric motor is connected through a planetary transmission at the first shaft of the main gear set.

The task of the invention is to improve the operating range of the transmission, such that, in any gear, the electric motor is able to receive mechanical power from the transmission output shaft or deliver power to it.

SUMMARY OF THE INVENTION

A transmission includes at least one transmission input shaft and one transmission output shaft, a main gear set, an auxiliary gear set, and an electric motor with a rotor and a stator.

The main gear set features a first and a second planetary gear set with a total of four shafts designated in the order of rotational speeds as the first, second, third and fourth shafts. The main gear set is thus formed as a two-carrier/four-shaft transmission. The auxiliary gear set features a planetary gear set with a total of three shafts designated as the first, second and third shafts. The first shaft of the auxiliary gear set is constantly connected to the rotor.

A "two-carrier/four-shaft transmission" is understood to be a planetary transmission that is formed from two individual planetary gear sets kinematically coupled with each other through exactly two coupling shafts, and with which four of its elements ("shafts") are freely accessible for other transmission elements. Thereby, a coupling shaft is defined as a constant mechanical connection between one element—thus, a sun gear or a carrier or a ring gear—of the first individual planetary gear set with one element—thus, a sun gear or a carrier or a ring gear—of the second individual planetary gear set. The number of individual planetary gear sets and the number of free shafts are not defined by the visual appearance of the transmission, but through its kinematics. In each gear of a two-carrier/four-shaft transmission, two of the shift elements of the transmission connected to elements of the two-carrier/four-shaft transmission must be locked. For the graphical representation of the kinematics of the transmission, a rotational speed diagram of the transmission (for example, the Kutzbach diagram known from transmission theory) is typically used. Known embodiments of such a two-carrier/four-shaft transmission include the so-called "Ravigneaux gear set" and the so-called "Simpson gear set."

A reduced two-carrier/four-shaft transmission is a structural shape of a two-carrier/four-shaft transmission in which one element—that is, a sun gear, a carrier or a ring gear—of the transmission is spared, since another element of the transmission takes over its task, without thereby changing the kinematics. That element that takes over the function of the spared element is thus one of the coupling shafts of the transmission at the same time. A known embodiment of this is the Ravigneaux gear set, which features either two sun gears and only one ring gear, or two ring gears and only one sun gear.

Through at least one power path, the transmission input shaft is connectable through at least one shift element to at least one of the four shafts of the main gear set. In a preferred embodiment, the at least one power path is connectable through two shift elements to two of the four shafts of the main gear set. By locking one of the shift elements, a torque-proof connection between the at least one power path and one of the four shafts of the main gear set is thus established, by which torque can be led from the transmission input shaft to one of the four shafts of the main gear set. "At least one power path" is to be understood such that the transmission features one or more power paths between the transmission input shaft and the main gear set. The third shaft of the main gear set is thereby connected to the transmission output shaft.

In accordance with aspects of the invention, the second shaft of the auxiliary gear set is constantly connected to the second shaft or to the third shaft of the main gear set. If the second shaft of the auxiliary gear set is connected to the second shaft of the main gear set, the third shaft of the auxiliary gear set is constantly connected to the third or the fourth shaft of the main gear set. By contrast, if the second shaft of the auxiliary gear set is connected to the third shaft of the main gear set, the third shaft of the auxiliary gear set is connected to the fourth shaft of the main gear set.

Upon use of a motor vehicle, the transmission input shaft is connectable to a shaft of a drive unit, or is connectable through a clutch, such that mechanical power of the drive unit can be supplied to the transmission input shaft. The drive unit may be formed as an internal combustion engine and as an electric motor. The transmission output shaft serves as an interface for transferring mechanical power to the drive wheels of the motor vehicle.

In the following, a "shaft" is not solely understood as an exemplary cylindrical, rotatably mounted machine element for the transfer of torques, but is also understood as a general connection element, which connects individual components or elements to each other, in particular connection elements that connect several elements to each other in a torque-proof manner.

A planetary gear set comprises a sun gear, a carrier and a ring gear. Planetary gears, which mesh with the toothing of the sun gear and/or with the toothing of the ring gear, are rotatably mounted on the carrier. In the following, a negative gear set describes a planetary gear set with a carrier, on which the planetary gears are rotatably mounted, with a sun gear and a ring gear, whereas the toothing of at least one of one of the planetary gears meshes both with the toothing of the sun gear and with the toothing of the ring gear, by which the ring gear and the sun gear rotate in opposite directions of rotation, if the sun gear rotates with a fixed carrier.

Both sun gear and ring gear of a planetary gear set can also be divided into several segments. For example, it is conceivable that the planet gears mesh with two sun gears, which are not connected to each other. Of course, the rotational speed relationships are identical on both segments of the sun gear, as if they were connected to each other.

A positive gear set differs from the negative planetary gear set just described in that the positive gear set features inner and outer planetary gears, which are rotatably mounted on the carrier. Thereby, the toothing of the inner planetary gears meshes, on the one hand, with the toothing of the sun gear and, on the other hand, with the toothing of the outer planetary gears. In addition, the toothing of the outer planetary gears meshes with the toothing of the ring gear. This has the consequence that, with a fixed carrier, the ring gear and the sun gear rotate in the same direction of rotation.

The stationary transmission ratio defines the rotational speed relationship between the sun gear and ring gear of a planetary gear with a torque-proof carrier. Since, with a negative gear set, the direction of rotation between the sun gear and ring gear with a torque-proof carrier is reversed, the stationary transmission ratio always increases to a negative value with a negative gear set.

In the rotational speed diagram, the rotational speed relationships of the individual shafts are plotted in a vertical direction. The horizontal gaps between the shafts arise from the transmission ratio relationships between the shafts, such that rotational speed relationships and torque relationships of the shafts pertaining to a given operating point can be connected by a straight line. The transmission ratio relationship between the shafts arise from the stationary transmission ratios of the planetary gear sets involved. The rotational speed diagram can be presented, for example, in the form of a Kutzbach diagram.

Four shafts designated in the order of rotational speeds as the first, second, third and fourth shafts are characterized in that the rotational speeds of such shafts in the specified sequence increase, decrease or are equal in a linear manner. In other words, the rotational speed of the first shaft is less than or equal to the rotational speed of the second shaft. In turn, the rotational speed of the second shaft is less than or equal to the rotational speed of the third shaft. The rotational speed of the third shaft is less than or equal to the rotational speed of the fourth shaft. This sequence is also reversible, such that the fourth shaft features the highest speed, while the first shaft assumes a rotational speed that is less than or equal to the rotational speed of the fourth shaft. Thereby, there is always a linear relationship between the rotational speeds of all four shafts.

Thereby, the rotational speed of one or more shafts can also assume negative values, or even the value of zero. Therefore, the order of rotational speeds is always to refer to the signed value of the rotational speeds, and not to their amount.

The rotational speeds of the four shafts are equal if, of the elements ring gear, carrier and sun of one of the planetary gear sets, two of such elements are connected to each other.

An electric motor consists of at least one torque-proof stator and one rotatably mounted rotor, and, during engine mode, is configured to convert electrical energy into mechanical energy in the form of rotational speed and torque, and, during generator mode, to convert mechanical energy into electrical energy in the form of current and voltage.

Through shift elements, depending on their operating state, a relative movement between two components is enabled, or a connection for the transmission of a torque between the two components is established. A "relative movement" is understood as, for example, a rotation of two components, whereas the rotational speed of the first component and the rotational speed of the second component differ from each other. In addition, the rotation of only one of the two components is conceivable, while the other component is at a standstill or rotates in the opposite direction. In the subject invention, the shift elements are preferably designed as claw-shift elements, which establish the connection by a positive connection.

Two elements are referred to as connected to each other particularly if there is a fixed (in particular, torque-proof) connection between the elements. Such connected elements rotate with the same rotational speed. The various components and elements of the specified invention may be connected to each other through a shaft or through a locked shift element or a connection element, or also directly, for example by a welded connection, a crimping connection or another connection.

Furthermore, two elements are described as connectable if there is a detachably torque-proof connection between such elements. If the connection exists, such elements rotate with the same rotational speed.

A shifting process is effected by locking a shift element of the transmission that was previously not located in the power flow of the transmission, and opening a shift element of the transmission previously located in the power flow of the transmission. The shifting process may also be undertaken under load, that is without a complete withdrawal of the torque at the transmission input shaft and the transmission output shaft. Such a shifting process is hereinafter referred to as a "load shift." With the use of claw-shift elements, a requirement for a load shift is that the shift element to be released is guided into a state that is at least nearly load-free prior to its release. The guiding into the state that is nearly load-free is achieved by the fact that the shift element is made largely free of torque, such that, through the shift element, no torque or only a small torque is transferred. For this purpose, through the electric motor, a torque is applied at that shaft with which the shift element to be released establishes a connection.

Through the allocation in accordance with aspects of the invention of the shafts of the main gear set to the second and third shafts of the auxiliary gear set, it is achieved that the rotor, even with a torque-proof fixing of the first shaft of the main gear set, is able to assume a rotational speed. This is a prerequisite for the electric motor to receive and deliver mechanical power. It is thereby enabled that the electric motor is capable of receiving or delivering mechanical power in those gears in which the first shaft of the main gear set is fixed in a torque-proof manner or does not have an appreciable rotational speed. This is particularly advantageous when using the transmission in a motor vehicle, since kinetic energy of the motor vehicle can be recuperated in each gear of the transmission through the generator mode of the electric motor. If an internal combustion engine is connected to the transmission input shaft, the load point of the internal combustion engine can also be displaced in any gear by the generator mode or engine mode of the electric motor. Thus, the transmission enables an increase in efficiency of the motor vehicle.

Preferably, the stationary transmission ratios of the planetary gear sets of the auxiliary gear set and the main gear set are selected in such a manner that, in the rotational speed diagram, the first shaft of the main gear set is located between the first shaft of the auxiliary gear set and the second shaft of the main gear set. The specific selection of the stationary transmission ratios depends on the design of the planetary gear sets and the allocation of their elements to the shafts of the main gear set and the auxiliary gear set.

Through the connection in accordance with aspects of the invention of the rotor to the shafts of the main gear set, it is achieved that, with a corresponding selection of the stationary transmission ratios of the participating planetary gear sets, the transmission ratio of the rotor to the shafts of the main gear set is increased. Through this enlarged transmission ratio, the torque to be applied by the rotor during the shifting process is reduced, by which the electric motor can be constructed smaller and lighter. In such a manner, with a load shift, the scaled-down electric motor may, even with a high torque at the transmission input shaft, apply the necessary torque, without leading to an undesirably high reduction in torque at the transmission output shaft. The enlarged transmission ratio is also useful if the torque of the electric motor is to be transferred to the transmission output shaft (for example, when using the transmission in a motor vehicle), by which an electric driving mode of the motor vehicle is enabled. Through the transmission ratio enlarged in such a manner, a start-up of the motor vehicle into an incline is possible even with a scaled-down electric motor. The enlarged transmission ratio is also useful if, starting from the electric motor, a torque is transferred to the transmission input shaft, for example when used for starting an internal combustion engine that is connected to the transmission input shaft. Moreover, the enlarged transmission ratio leads to the fact that the electric motor is smaller, and thus can be more easily built.

In the following, an exemplary version for a design of the stationary transmission ratios is shown. As an example, a sun gear of the first planetary gear set of the main gear set is a component of the first shaft of the main gear set. A carrier of the first planetary gear set and a ring gear of the second planetary gear set are components of the second shaft of the main gear set. A ring gear of the first planetary gear set and a carrier of the second planetary gear set are components of the third shaft of the main gear set. A sun gear of the second planetary gear set of the main gear set is a component of the fourth shaft of the main gear set. A sun gear of the planetary gear set of the auxiliary gear set is an exemplary component of the first shaft of the auxiliary gear set. A carrier of the planetary gear set of the auxiliary gear set is a component of the second shaft of the auxiliary gear set, and a ring gear of the planetary gear set of the auxiliary gear set is a component of the third shaft of the auxiliary gear set. All planetary gear sets are formed as negative gear sets.

If, in this exemplary version, the second shaft of the auxiliary gear set is connected to the second shaft of the main gear set, and if the third shaft of the auxiliary gear set is connected to the third shaft of the main gear set, the transmission ratio of the rotor at the shafts of the main gear set is only increased if the amount of the stationary transmission ratio of the planetary gear set of the auxiliary gear set is greater than the amount of the stationary transmission ratio of the first planetary gear set of the main gear set.

If, in this exemplary version, the second shaft of the auxiliary gear set is connected to the third shaft of the main gear set, and if the third shaft of the auxiliary gear set is connected to the fourth shaft of the main gear set, an increase in the transmission ratio of the rotor at the shafts of the main gear set is dependent on the stationary transmission ratio of the auxiliary gear set and on the stationary transmission ratios of the two planetary gear sets of the main gear set. Thereby, the amount of the stationary transmission ratio of the planetary gear set of the auxiliary gear set must be greater than the amount of the stationary transmission ratio, increased by the value of one, of the first planetary gear set of the main gear set, whereas such sum must be divided by the amount of the stationary transmission ratio of the second planetary gear set of the main gear set.

Preferably, a sun gear of the planetary gear set of the auxiliary gear set is a component of the first shaft of the auxiliary gear set. In the event that the planetary gear set of the auxiliary gear set is formed as a negative gear set, a carrier of the planetary gear set of the auxiliary gear set is a component of the second shaft of the auxiliary gear set, and a ring gear of the planetary gear set of the auxiliary gear set is a component of the third shaft of the auxiliary gear set. If the planetary gear set of the auxiliary gear set is formed as a positive gear set, the allocation of the ring gear and the carrier is interchanged, such that the ring gear of the planetary gear set of the auxiliary gear set is a component of the second shaft of the auxiliary gear set, and the carrier of the planetary gear set of the auxiliary gear set is a component of the third shaft of the auxiliary gear set.

However, the allocation of the planetary gear set of the auxiliary gear set to the main gear set may also take place in mirrored form, by the sun gear of the planetary gear set of the auxiliary gear set being a component of the third shaft of the auxiliary gear set. If the planetary gear set of the auxiliary gear set is thereby formed as a negative gear set, the carrier of the planetary gear set of the auxiliary gear set is a component of the second shaft of the auxiliary gear set, and the ring gear of the planetary gear set of the auxiliary gear set is a component of the first shaft of the auxiliary gear set. If the planetary gear set of the auxiliary gear set is formed as a positive gear set, the allocation of the ring gear and the carrier is interchanged, such that the ring gear of the planetary gear set of the auxiliary gear set is a component of the second shaft of the auxiliary gear set, and the carrier of the planetary gear set of the auxiliary gear set is a component of the first shaft of the auxiliary gear set.

Through this allocation of the elements of the auxiliary gear set to the three shafts of the auxiliary gear set, together with the allocation in accordance with aspects of the invention of such three shafts to the four shafts of the main gear set, it is achieved that the first shaft of the main gear set in the rotational speed diagram is always arranged between the first shaft of the auxiliary gear set and the second shaft of the main gear set, to the extent that dependence on the stationary transmission ratios described above by way of example is observed. Through the multiple number of options offered for the connection between the rotor, the auxiliary gear set and the main gear set, aspects of the invention are thus particularly easily adjustable for various transmission variants and available installation space ratios.

The sequence of the four shafts of the main gear set in the rotational speed diagram depends on the manner in which shafts are allocated to which elements of the first and second planetary gear sets of the main gear set, and which of the four shafts are connected to each other. Examples of this are known in the state of the art, but certain variations have emerged as particularly advantageous for implementation in a transmission. These are particularly advantageous based on a geometrically favorable arrangement, based on reduced component stress and based on improved accessibility to the shift elements.

In accordance with a first preferred variant, the first shaft of the main gear set is connected to a sun gear of the first planetary gear set of the main gear set. The second shaft of the main gear set is connected to a carrier of the first planetary gear set and to a ring gear of the second planetary gear set of the main gear set. The third shaft of the main gear set is connected to a ring gear of the first planetary gear set and to a carrier of the second planetary gear set of the main gear set. The fourth shaft of the main gear set is connected to a sun gear of the second planetary gear set of the main gear set. Thereby, the first and second planetary gear sets are formed as negative gear sets.

In accordance with a second preferred variant, the first shaft of the main gear set is connected to the sun gear of the first planetary gear set of the main gear set. The second shaft of the main gear set is connected to the carrier of the first planetary gear set and to the ring gear of the second planetary gear set of the main gear set. The third shaft of the main gear set is connected to the carrier of the second planetary gear set of the main gear set. The fourth shaft of the main gear set is connected to the ring gear of the first planetary gear set and the sun gear with the second planetary gear set of the main gear set. Thereby, the first and second planetary gear sets are formed as negative gear sets.

In accordance with a third preferred variant, the first shaft of the main gear set is connected to the sun gear of the first planetary gear set of the main gear set. The second shaft of the main gear set is connected to the ring gear of the second planetary gear set of the main gear set. The third shaft of the main gear set is connected to the carriers of the first and second planetary gear sets of the main gear set. The fourth shaft of the main gear set is connected to the ring gear of the first planetary gear set and to the sun gear of the second planetary gear set of the main gear set. Thereby, the first and second planetary gear sets are formed as negative gear sets.

In accordance with a fourth preferred variant, the first shaft of the main gear set is connected to the sun gear of the first planetary gear set and to the sun gear of the second planetary gear set of the main gear set. The second shaft of the main gear set is connected to the carrier of the first planetary gear set of the main gear set. The third shaft of the main gear set is connected to the ring gear of the first planetary gear set of the main gear set and to the carrier of the second planetary gear set of the main gear set. The fourth shaft of the main gear set is connected to the ring gear of the second planetary gear set of the main gear set. Thereby, the first and second planetary gear sets are formed as negative gear sets.

In accordance with a fifth preferred variant, the first shaft of the main gear set is connected to the sun gears of the first and second planetary gear sets of the main gear set. The second shaft of the main gear set is connected to the carrier of the second planetary gear set of the main gear set. The third shaft of the main gear set is connected to the carrier of the first planetary gear set and to the ring gear of the second planetary gear set of the main gear set. The fourth shaft of the main gear set is connected to the ring gear of the first planetary gear set of the main gear set. Thereby, the first and second planetary gear sets are formed as negative gear sets.

In accordance with a sixth preferred variant, the first shaft of the main gear set is connected to the sun gear of the first planetary gear set of the main gear set. The second shaft of the main gear set is connected to the carriers of the first and second planetary gear sets of the main gear set. The third shaft of the main gear set is connected to the ring gear of the first and second planetary gear sets of the main gear set. The fourth shaft of the main gear set is connected to the sun gear of the second planetary gear set of the main gear set. Thereby, the first planetary gear set is formed as a negative gear set, while the second planetary gear set is formed as a positive gear set.

Preferably, the transmission may be a component of a hybrid drive train of a motor vehicle. The hybrid drive train features an internal combustion engine, in addition to the transmission. The internal combustion engine is connected or connectable, either directly or through a clutch, to the transmission input shaft of the transmission. The motor vehicle may be driven by both the internal combustion engine and the electric motor of the transmission. Optionally, the transmission features an auxiliary electric motor, which is configured to deliver torque to the transmission input shaft through its rotor, and, in such a way, start the internal combustion engine. This has the advantage that the internal combustion engine can be started by the auxiliary electric motor, without having any influence on a simultaneous electric driving mode, by the motor vehicle being driven solely by the electric motor of the transmission.

The electric motor is thereby connected to a converter, through which the electric motor is connected to an energy storage device. For this purpose, any form of energy storage device (in particular, an electrochemical, electrostatic, hydraulic or mechanical energy storage device) is suitable.

In an additional embodiment, the transmission may also be a component of a drive train of an electric motor vehicle. An electric motor vehicle is driven solely by one or more electric motors, and accordingly has no internal combustion engine. In this case, a traction electric motor is connected to the transmission input shaft. Through the different transmission ratio stages of the transmission, the traction electric motor may always be operated in an operating range with a high degree of efficiency, by which the energy efficiency of the entire electric motor vehicle is improved.

BRIEF DESCRIPTION OF THE DRAWINGS

Embodiments of the invention are described in detail on the basis of the attached figures.

FIG. 3 shows a shifting diagram of the transmission in accordance with the first and second exemplary embodiments.

FIG. 6 shows a shifting diagram of the transmission in accordance with the second exemplary embodiment.

FIG. 11 shows a shifting diagram of the transmission in accordance with the fourth exemplary embodiment.

DETAILED DESCRIPTION

Figure 1:
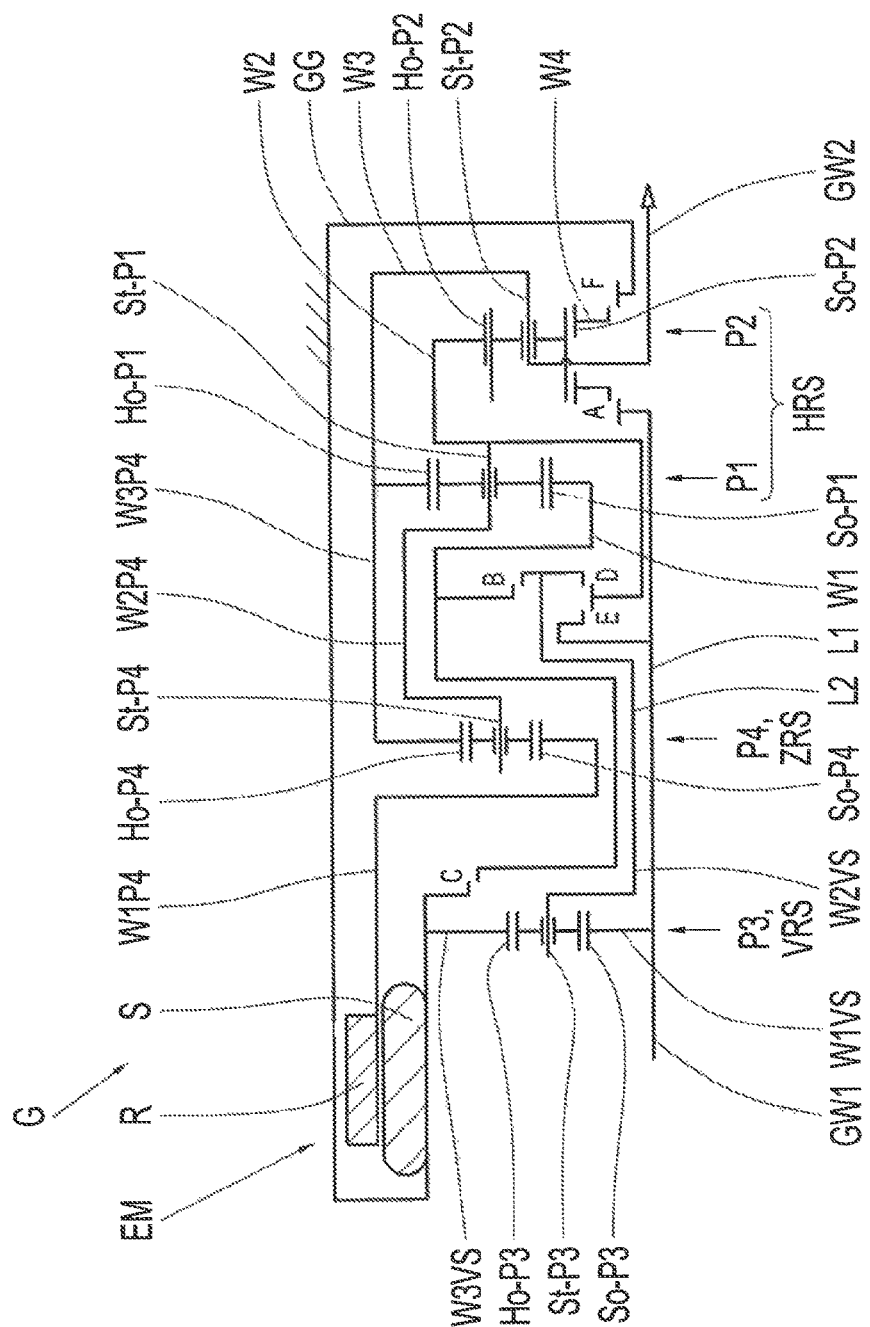
FIG. 1 schematically shows a transmission in accordance with a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

At the outset, it must be stated that, in the various described embodiments, the same parts are provided with the same reference signs or the same component names, whereby the disclosures contained throughout the description can be transferred analogously to the same parts with the same reference signs or the same component names.

FIG. 1 schematically shows a transmission G in accordance with a first exemplary embodiment of the invention. The transmission G features an upstream gear set VRS, an auxiliary gear set ZRS and a main gear set HRS. The upstream gear set VRS features a planetary gear set P3, and the auxiliary gear set ZRS features a planetary gear set P4, while the main gear set HRS features a first planetary gear set P1 and a second planetary gear set P2. All planetary gear sets P1, P2, P3, P4 are formed as negative gear sets.

The presentation of the transmission G essentially shows the connectable and connected elements of the transmission G. Conclusions regarding the transmission ratio relationships cannot be drawn by the distances selected in the presentation of the transmission G.

The transmission input shaft GW1 is connected to a sun gear So-P3 of the first planetary gear set P3 of the upstream gear set VRS, while a ring gear Ho-P3 of the first planetary gear set P3 of the upstream gear set VRS is connected in a torque-proof manner to the transmission housing GG of the transmission G, or to a different component of the transmission G that is fixed in a torque-proof manner. In such a way, a first and a second power path L1, L2 are formed, whereas power from the transmission input shaft GW1 can be transferred to the main gear set HRS through both the first power path L1 and through the second power path L2. The second power path L2 thereby transmits to the main gear set HRS a rotational speed that is changed compared to the rotational speed of the transmission input shaft GW1, by translating the rotational speed at the transmission input shaft GW1 by the transmission ratio between the sun gear So-P3 and a carrier St-P3 of the first planetary gear set P3 of the upstream gear set VRS. The first power path L1 transmits the rotational speed of the transmission input shaft GW1 without a transmission ratio to the main gear set HRS. Thereby, the sun gear So-P3 of the first planetary gear set P3 of the upstream gear set VRS is a component of a first shaft W1VS of the upstream gear set VRS, which is connected to the transmission input shaft GW1. The carrier St-P3 of the first planetary gear set P3 of the upstream gear set VRS is a component of a second shaft W2VS of the upstream gear set VRS. That component on which the ring gear Ho-P3 of the first planetary gear set P3 of the upstream gear set VRS is supported is referred to below as the third shaft W3VS of the upstream gear set VRS.

A first shaft W1 of the main gear set HRS is connected to a sun gear So-P1 of the first planetary gear set P1 of the main gear set HRS. A second shaft W2 of the main gear set HRS is connected to a carrier St-P1 of the first planetary gear set P1 and to a ring gear Ho-P2 of the second planetary gear set P2 of the main gear set HRS. A third shaft W3 of the main gear set HRS is connected to a ring gear Ho-P1 of the first planetary gear set P1 and to a carrier St-P2 of the second planetary gear set P2 of the main gear set HRS. A fourth shaft W4 of the main gear set HRS is connected to a sun gear So-P2 of the second planetary gear set P2 of the main gear set HRS. Through this arrangement and connection between the individual components of the first and second planetary gear sets P1, P2 of the main gear set HRS, the arrangement of the first, second, third and fourth shafts W1, W2, W3, W4 of the main gear set HRS in the rotational speed diagram is determined, whereas the sequence of first, second, third, fourth shafts W1, W2, W3, W4 corresponds to their sequence in the rotational speed diagram. The third shaft W3 is connected to the transmission output shaft GW2. Alternatively, the third shaft W3 may also be connected through an additional transmission gearing to the transmission output shaft GW2. Thereby, the sun gear So-P2 of the second planetary gear set P2 of the main gear set HRS features two parts that are separate from each other. This facilitates the connection of the transmission output shaft GW2 to the third shaft W3 of the main gear set HRS, which is carried out between the two parts of the sun gear So-P2. Of course, the rotational speed relationships are the same on both parts of the sun gear So-P2 of the second planetary gear set P2 of the main gear set HRS. Consequently, hereinafter, both parts of the sun gear So-P2 of the second planetary gear set P2 of the main gear set HRS are referred to as one component of the same shaft, specifically the fourth shaft W4 of the main gear set HRS. In an alternative embodiment that is not shown for reasons of clarity, the sun gear So-P2 of the second planetary gear set P2 of the main gear set HRS may also be designed in one piece, for example, in the case of a use in a motor vehicle, as a transmission G for a drive train arranged in a manner transverse to the direction of travel, whereas the transmission G has an axially parallel output.

At this point, it should be noted that other connection combinations of the components of the first and second planetary gear sets P1. P2 of the main gear set HRS could lead to such a sequence of the arrangement of the rotational speeds of the four shafts W1, W2, W3, W4 of the main gear set HRS. As such, the invention is not limited to the combination option described above. Thus, the presented combination is to be regarded merely as an example.

The first power path L1 is connectable through a first shift element A to the fourth shaft W4 of the main gear set HRS and through a second shift element E to the second shaft W2 of the main gear set HRS. The second power path L2 is connectable through a third shift element B to the first shaft W1 of the main gear set HRS and through a fourth shift element D to the second shaft W2 of the main gear set HRS. The first shaft W1 of the main gear set HRS is connectable through a fifth shift element C to the transmission housing GG of the transmission G, or to another torque-proof component of the transmission G, such that, with a locked fifth shift element C, the first shaft W1 of the main gear set HRS cannot assume any rotational speed. In the same manner, the fourth shaft W4 of the main gear set HRS can be fixed in a torque-proof manner through a sixth shift element F, by connecting the fourth shaft W4 through the sixth shift element F to the transmission housing GG.

In the first exemplary embodiment of the transmission G, in each case, two shift elements can be actuated by a double-acting shift device. The second and fourth shift elements E, D can be actuated through a first shift device. The third and the fifth shift elements B, C can be actuated through a second shift device. The first and sixth shift elements A, F can be actuated through a third shift device. Thereby, each of the three shift devices may occupy three states. In a first shifting state of the shift device, the first shift element allocated to the shift device is in a locked position, while the second shift element allocated to the shift device occupies an open position. In a second shifting state of the shift device, the second shift element allocated to the shift device is in a locked position, while the first shift element allocated to the shift device occupies an open position. In a third shifting state, the two shift elements allocated to the shift device occupy the open position. Based on the design of the main gear set HRS and the connection of the main gear set HRS to the electric motor EM, this allocation of a total of six shift elements A, B, C, D, E, F to only three shift devices is enabled. Moreover, this reduced number of shift devices helps to reduce the complexity of the transmission G.

The transmission G features an electric motor EM, whereas a stator S is connected in a torque-proof manner to the transmission housing GG of the transmission G or to another torque-proof component of the transmission G, such that the stator S cannot assume any rotational speed. A rotatably mounted rotor R is connected to a sun gear So-P4 of the planetary gear set P4 of the auxiliary gear set ZRS. The sun gear So-P4 of the planetary gear set P4 of the auxiliary gear set ZRS is a component of a first shaft W1P4 of the auxiliary gear set ZRS. A carrier St-P4 of the planetary gear set P4 of the auxiliary gear set ZRS is a component of a second shaft W2P4 of the auxiliary gear set ZRS, and is connected to the second shaft W2 of the main gear set HRS. A ring gear Ho-P4 of the planetary gear set P4 of the auxiliary gear set ZRS is a component of a third shaft W3P4 of the auxiliary gear set ZRS, and is connected to the third shaft W3 of the main gear set HRS.

Figure 2:
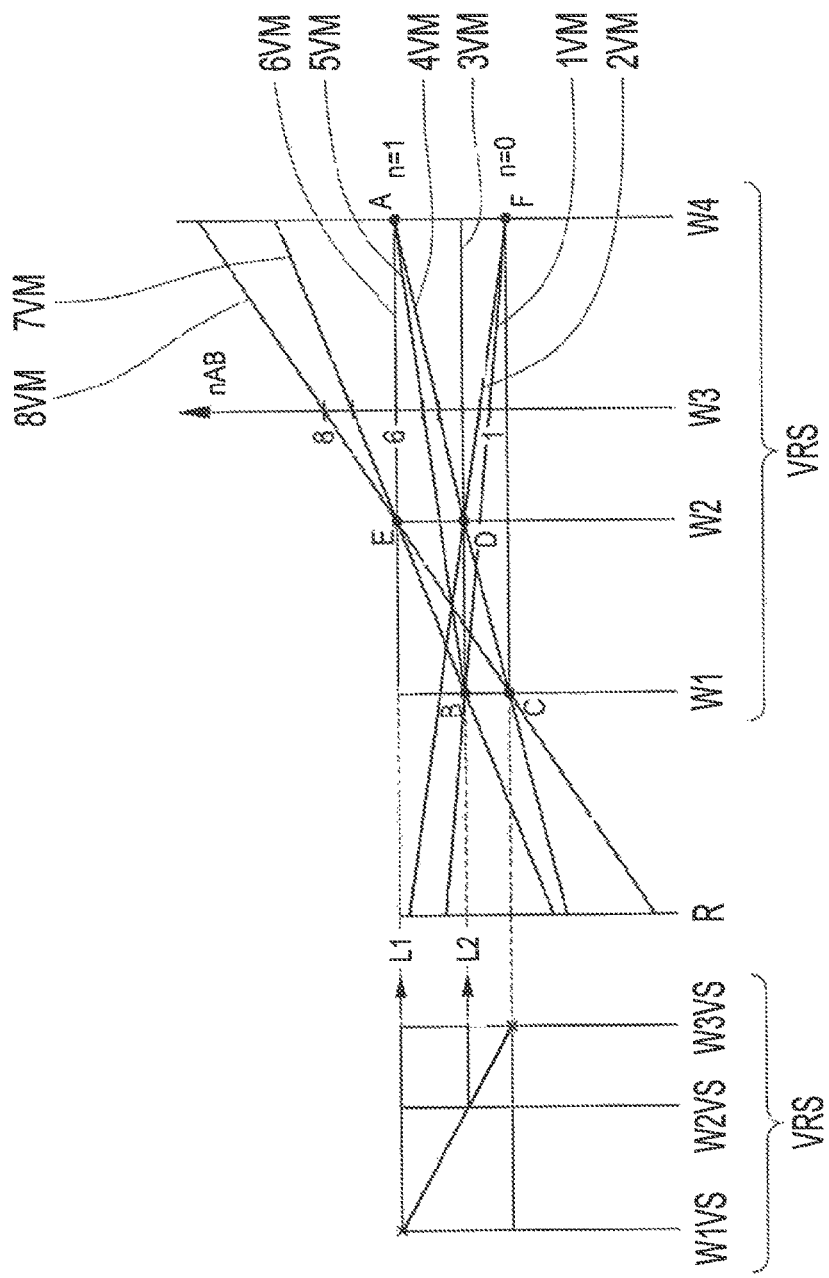
FIG. 2 shows a rotational speed diagram of the transmission in accordance with the first exemplary embodiment.

FIG. 2 shows a rotational speed diagram of the first exemplary embodiment of the transmission G, while a shifting diagram of the first exemplary embodiment of the transmission G is shown in FIG. 3. In FIG. 2, the rotational speeds of the four shafts W1, W2, W3, W4 of the main gear set HRS and the rotor R are plotted in a vertical direction in relation to the rotational speed of the transmission input shaft GW1. The maximum arising rotational speed of the transmission input shaft GW1 is normalized to the value of one. The distances between the four shafts W1, W2, W3, W4 of the main gear set HRS and the rotor R arise from the stationary transmission ratios of the first and second planetary gear sets P1, P2 of the main gear set HRS and the stationary transmission ratio of the planetary gear set P4 of the auxiliary gear set ZRS. Rotational speed relationships pertaining to a given operating point can be connected by a straight line.

If two shafts are connected to each other, such shafts connected to each other rotate with the same rotational speed. For reasons of clarity, such connected shafts can be shown separated from each other horizontally in the rotational speed diagram, in order to, for example, better clarify the rotational speed transfer from the upstream gear set VRS through the first or second power paths L1, L2 to the main gear set HRS. The horizontal distance between the connected shafts that is thereby selected in the rotational speed diagram is arbitrary. Of course, the transmission ratio between such connected shafts amounts to the value of one, independent of the horizontal distance selected in the rotational speed diagram.

If, of the ring gear, carrier and sun of a planetary gear set, two of such elements are connected to each other, the ring gear, carrier and sun of such planetary gear set rotate with the same rotational speed. In this state, the transmission ratio relationship between the specified elements assumes the value of one. For reasons of clarity, the horizontal arrangement of the shafts connected to such elements is not shifted in the rotational speed diagram. Consequently, this condition can be seen in the rotational speed diagram by a horizontal straight line, which connects the participating shafts to each other.

FIG. 3 shows a shifting diagram of the transmission G in accordance with the first exemplary embodiment. Through the shifting diagram in FIG. 3 and the rotational speed diagram in FIG. 2, the operation of the first exemplary embodiment of the transmission G becomes clear. The locked shift elements A, B, C, D, E, F are indicated by circles in FIG. 3. By way of example, the respective transmission ratios of the individual gear steps and the gear jumps to the next higher gear to be determined from them may be taken from the shifting diagram, whereas the transmission G in such a way features a spread of 10.1. The transmission ratios arise from the stationary transmission ratios of the planetary gear sets P1, P2, P3, P4. Upon a sequential shifting operation, double gearshifts and group gearshifts can be avoided, since two adjacent gear steps jointly use one shift element. The gears of the transmission G are shown in the various lines of the shifting diagram. One column of the shifting diagram further indicates whether the electric motor EM in the relevant gear is able to deliver mechanical power to the transmission output shaft GW2, or receive mechanical power from it.

A first forward gear 1VM between the transmission input shaft GW1 and the transmission output shaft GW2 arises from the locking of the third shift element B and the sixth shift element F, a second forward gear 2VM arises from the locking of the fourth shift element D and the sixth shift element F, a third forward gear 3VM arises from the locking of the third shift element B and the fourth shift element D, a fourth forward gear 4VM arises from the locking of the fourth shift element D and the first shift element A, a fifth forward gear 5VM arises from the locking of the third shift element B and the first shift element A, a sixth forward gear 6VM arises from the locking of the second shift element E and the first shift element A, a seventh forward gear 7VM arises from the locking of the third shift element B and the second shift element E, and an eighth forward gear 8VM arises from the locking of the fifth shift element C and the second shift element E.

In an electric gear 1EM, torque is transferred to transmission output shaft GW2 solely by the electric motor EM, whereas all shift elements except for the sixth shift element F are open, and there is thus no torque-transferring connection between the transmission input shaft GW1 and the transmission output shaft GW2. The electrical gear 1EM also serves as a reverse gear, in which the electric motor EM is driven in such a manner that the rotor R assumes a negative rotational speed; that is, a reverse rotation. Thus, a separate reverse gear is not necessary.

In the first and second start modes 1S, 2S, torque is supplied to the transmission input shaft GW1, whereas, depending on the position of the sixth shift element F, torque can be supplied to the transmission input shaft GW1 exclusively by the electric motor EM or by the transmission output shaft GW2. If the sixth shift element F is locked, and the electric motor EM does not deliver any torque, the transmission input shaft GW1 may also be supplied with torque exclusively by the transmission output shaft GW2. This is particularly relevant when using the transmission G in a motor vehicle, in order to, in such a way, start an internal combustion engine VKM connected to the transmission input shaft GW1. If the sixth shift element F is thereby open, the transmission output shaft GW2 must be fixed in a torque-proof manner by a parking brake.

In the following, a load-shifting process is described by way of example. In the second forward gear, each of the second and the fourth shafts W2, W4 of the main gear set HRS forms a differential shaft, while the third shaft W3 of the main gear set HRS represents a sum shaft. Upon a shifting process from the second forward gear 2VM to the third forward gear 3VM, the fourth shift element D is locked. The sixth shift element F is open; the third shift element B is subsequently locked. If the sixth shift element F is formed as claw-shift element, the sixth shift element F must be made largely free of torque prior to opening, such that the sixth shift element F only transfers no torque or low torque. This load release of the sixth shift element F is effected by a generator torque of the electric motor EM. Thereby, at least one portion of the torque previously applied at the third shaft W3 of the main gear set HRS is maintained, by which a complete loss of torque does not arise at the transmission output shaft GW2. If the sixth shift element F is open, the second shaft W2 of the main gear set HRS becomes the sum shaft, while the first shaft W1P4 of the auxiliary gear set ZRS and the third shaft W3 of the main gear set HRS each form a differential shaft. Through the electric motor EM, a generator torque is now applied, in order to achieve a synchronization of rotational speeds between the second shaft W2VS of the upstream gear set VRS and the first shaft W1 of the main gear set HRS. This enables a locking of the third shift element B, whereas at least one portion of the torque previously applied at the third shaft W3 of the main gear set HRS is maintained. If the third shift element B is locked, the first shaft W1 of the main gear set HRS becomes the differential shaft; the shifting process is thus completed. This ensures that, during the shifting process, one part of the power flow of the transmission input shaft GW1 at the transmission output shaft GW2 can be maintained. This mode of operation applies to all embodiments.

Figure 4:
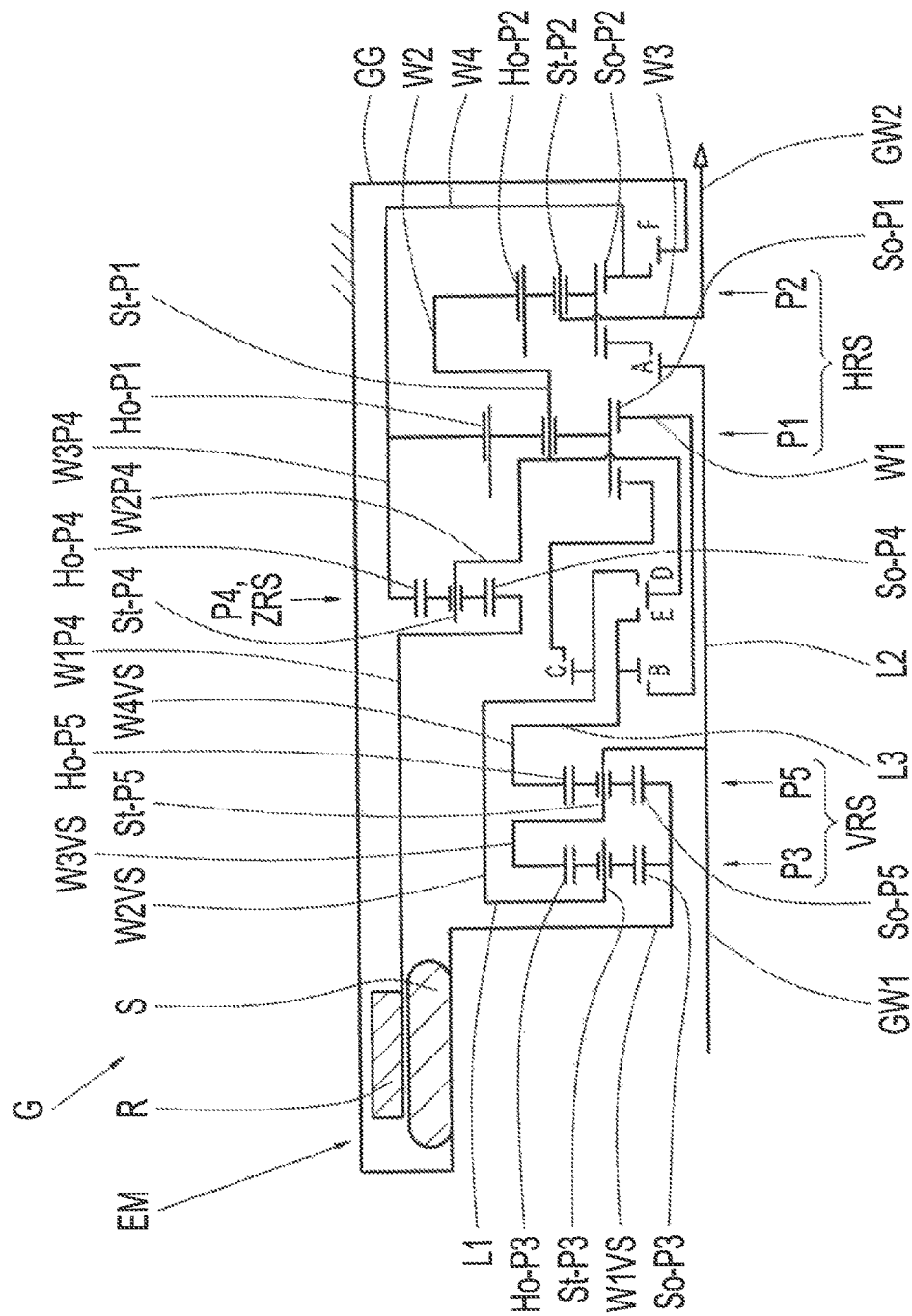
FIG. 4 schematically shows a transmission in accordance with a second exemplary embodiment of the invention.

FIG. 4 schematically shows a transmission G in accordance with a second exemplary embodiment of the invention. In contrast to the first exemplary embodiment, an upstream gear set VRS, which features a second planetary gear set P5 in addition to the first planetary gear set P3, is upstream of the main gear set HRS in the second exemplary embodiment. In this second exemplary embodiment as well, all planetary gear sets P1, P2, P3, P4, P5 are formed as negative gear sets. The upstream gear set VRS features four shafts W1VS, W2VS, W3VS and W4VS designated as the first, second, third and fourth shafts. The sun gear So-P3 of the first planetary gear set P3 of the upstream gear set VRS and the sun gear So-P5 of the second planetary gear set P5 of the upstream gear set VRS are connected to each other and are fixed in a torque-proof manner, and form a component of the first shaft W1VS of the upstream gear set VRS. The ring gear Ho-P3 of the first planetary gear set P3 of the upstream gear set VRS is connected to the transmission input shaft GW1 and thereby forms a component of the third shaft W3VS of the upstream gear set VRS. The carrier St-P3 of the first planetary gear set P3 of the upstream gear set VRS is a component of the second shaft W2VS and the first power path L1. The second power path L2 leads directly through the transmission input shaft GW1 to the main gear set HRS. The carrier St-P5 of the second planetary gear set P5 of the upstream gear set VRS is connected to the third shaft W3VS of the gear set VRS. The ring gear Ho-P5 of the second planetary gear set P5 of the upstream gear set VRS is a component of the fourth shaft W4VS of the upstream gear set VRS and a third power path L3. The first power path L1 is connectable through the fourth shift element ID to the second shaft W2 of the main gear set HRS and through the fifth shift element C to the first shaft W1 of the main gear set HRS. The second power path L2 is connectable through the first shift element A to the fourth shaft W4 of the main gear set HRS. The third power path L3 is connectable through the third shift element B to the first shaft W1 of the main gear set HRS and through the second shift element E to the second shaft W2 of the main gear set HRS. Through the sixth shift element F, the fourth shaft W4 of the main gear set HRS can be fixed in a torque-proof manner.

The main gear set HRS of the second exemplary embodiment is structured as follows: the first shaft W1 of the main gear set HRS is connected to the sun gear So-P1 of the first planetary gear set P1 of the main gear set HRS. The second shaft W2 of the main gear set HRS is connected to the carrier St-P1 of the first planetary gear set P1 and to the ring gear Ho-P2 of the second planetary gear set P2 of the main gear set HRS. The third shaft W3 of the main gear set HRS is connected to the carrier St-P2 of the second planetary gear set P2 of the main gear set HRS. The fourth shaft W4 of the main gear set HRS is connected to the ring gear Ho-P1 of the first planetary gear set P1 of the main gear set HRS and to the sun gear So-P2 of the second planetary gear set P2 of the main gear set HRS. The sun gears So-P1 and So-P2 of the two planetary gear sets P1, P2 of the main gear set are designed in two parts. One part of the sun gear So-P1 of the first planetary gear set P1 of the main gear set HRS is connected to that component of the first shaft W1 of the main gear set HRS that leads to the fifth shift element C. The other part of the sun gear So-P1 of the first planetary gear set P1 of the main gear set HRS is connected to that component of the first shaft W1 of the main gear set HRS that leads to the third shift element B. Between the two parts of the sun gear So-P1 of the first planetary gear set P1 of the main gear set HRS, the second shaft W2 of the main gear set HRS leads to the second shift element E and to the fourth shift element D. One part of the sun gear So-P2 of the second planetary gear set P2 of the main gear set HRS is that component of the fourth shaft W4 of the main gear set HRS that leads to the first shift element A. The other part of the sun gear So-P2 of the second planetary gear set P2 of the main gear set HRS is connected to that component of the fourth shaft W4 that leads to the sixth shift element F. Between the two parts of the sun gear So-P2 of the second planetary gear set P2 of the main gear set HRS, the third shaft W3 of the main gear set HRS leads to the transmission output shaft GW2.

In the third exemplary embodiment as well, the transmission G features an electric motor EM, whereas the stator S is connected in a torque-proof manner to the transmission housing GG of the transmission G or to another torque-proof component of the transmission G, such that the stator S cannot assume any rotational speed. The rotatably mounted rotor R is connected to the sun gear So-P4 of the planetary gear set P4 of the auxiliary gear set ZRS. The sun gear So-P4 of the planetary gear set P4 of the auxiliary gear set ZRS is thereby a component of the first shaft W1P4 of the auxiliary gear set ZRS. The carrier St-P4 of the planetary gear set P4 of the auxiliary gear set ZRS is a component of the second shaft W2P4 of the auxiliary gear set ZRS, and is connected to the second shaft W2 of the main gear set HRS. The ring gear Ho-P4 of the planetary gear set P4 of the auxiliary gear set ZRS is a component of the third shaft W3P4 of the auxiliary gear set ZRS, and is connected to the fourth shaft W4 of the main gear set HRS.

Accordingly, in the second exemplary embodiment shown in FIG. 4, the first shaft W1P4 of the auxiliary gear set ZRS is connected to the rotor R, while the second W2P4 of the auxiliary gear set ZRS is connected to the second shaft W2 of the main gear set HRS. The third shaft W3P4 of the auxiliary gear set ZRS is connected to the fourth shaft W4 of the main gear set HRS. Alternatively, the second shaft W2P4 of the auxiliary gear set ZRS could also be connected to, instead of the second shaft W2, the third shaft W3 of the main gear set HRS. In accordance with an additional alternative, the third shaft W3P4 of the auxiliary gear set ZRS could be connected to the third shaft W3 of the main gear set HRS, whereas, in this case, the second shaft W2P4 of the auxiliary gear set ZRS is connected to the second shaft W2 of the main gear set HRS. The stationary transmission ratios of the participating planetary gear sets are to be adjusted accordingly. For reasons of clarity, such alternatives of the second exemplary embodiment are not shown in separate figures.

Figure 5:
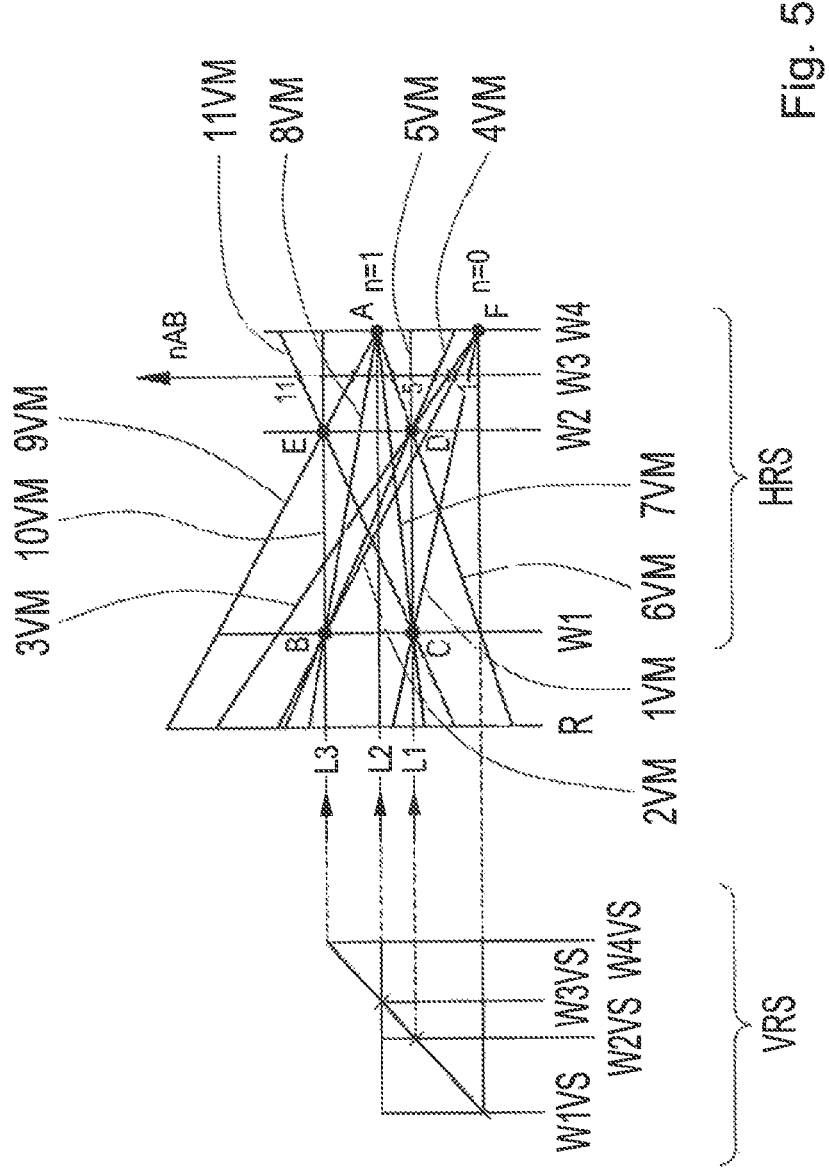
FIG. 5 shows a rotational speed diagram of the transmission in accordance with the second exemplary embodiment.

FIG. 5 shows a rotational speed plan of the second exemplary embodiment of the transmission G, while FIG. 6 shows a shifting diagram of the second exemplary embodiment of the transmission G. The manner of presentation is identical to the presentation of the first exemplary embodiment.

The four shafts W1VS, W2VS, W3VS, W4VS of the upstream gear set VRS are also shown in the rotational speed diagram. If one of the shift elements A, B, C, D, E is locked, through the locked shift element A, B, C, D, E, a torque-transferring connection between a power path L1, L2, L3 and one of the four shafts W1, W2, W3, W4 of the main gear set HRS is established.

It can be seen from the rotational speed diagram that the first and third power paths L1, L3 undergo a transmission ratio starting from the third shaft W3VS of the upstream gear set VRS, whereas the third shaft W3VS of the upstream gear set VRS is connected to the transmission input shaft GW1. Through the first power path L1, the rotational speed is reduced in relation to the transmission input shaft GW1, while, through the third power path L3, the rotational speed is increased in relation to the transmission input shaft GW1. In the second power path L2, the rotational speed of the transmission input shaft GW1 is led without a transmission ratio directly to the first or fourth shafts W1, W4 of the main gear set HRS.

Through the shifting diagram in FIG. 6 and the rotational speed diagram in FIG. 5, the operation of the second exemplary embodiment of the transmission G becomes clear. The locked shift elements A, B, C, D, E, F are indicated by circles in FIG. 6. By way of example, the respective transmission ratios of the individual gear steps and the gear jumps to the next higher gear to be determined from them may be taken from the shifting diagram, whereas the transmission G in such a way has a spread of 11.0. The transmission ratios arise from the stationary transmission ratios of the planetary gear sets P1, P2, P3, P4, P5. The gears of the transmission G are shown in the various lines of the shifting diagram. The manner of presentation is identical to the presentation of the first exemplary embodiment.

The first forward gear 1VM between the transmission input shaft GW1 and the transmission output shaft GW2 arises from the locking of the fifth shift element C and the sixth shift element F, the second forward gear 2VM arises from the locking of the third shift element B and the sixth shift element F, the third forward gear 3VM arises from the locking of the fourth shift element D and the sixth shift element F, the fourth forward gear 4VM arises from the locking of the third shift element B and the fourth shift element D, the fifth forward gear 5VM arises from the locking of the fifth shift element C and the fourth shift element D, the sixth forward gear 6VM arises from the locking of the first shift element A and the fourth shift element D, the seventh forward gear 7VM arises from the locking of the fifth shift element C and the first shift element A, the eighth forward gear 8VM arises from the locking of the third shift element B and the first shift element A, a ninth forward gear 9VM arises from the locking of the second shift element E and the first shift element A, a tenth forward gear 10VM arises from the locking of the third shift element B and the second shift element E, and an eleventh forward gear 11VM arises from the locking of the fifth shift element C and the second shift element E.

In an electric gear 1EM, torque is transferred to transmission output shaft GW2 solely by the electric motor EM, whereas the first, second, third, fourth and fifth shift elements A, E, B, D, C are open, and there is thus no torque-transferring connection between the transmission input shaft GW1 and the transmission output shaft GW2. The sixth shift element F is locked. The electrical gear also serves as a reverse gear, in which the electric motor EM is driven in such a manner that the rotor R assumes a negative rotational speed; that is, a reverse rotation. Thus, a separate reverse gear is not necessary.

In the first and second start modes 1S, 2S, the transmission input shaft GW1 is supplied with torque from the electric motor EM. In the first start mode 1S, all shift elements are open, except for the third shift element B. The rotor R of the electric motor EM is thereby connected directly to the transmission input shaft GW1. In the second start mode 2S, all shift elements are open, except for the fifth shift element C. The torque of the electric motor EM is thereby guided through the first power path L1 to the transmission input shaft GW1. The first and second start modes 1S and 2S are particularly relevant upon the use of the transmission G in the motor vehicle, in order to, in such a way, start an internal combustion engine VKM connected to the transmission input shaft GW1. Thereby, the transmission output shaft GW2 must be fixed in a torque-proof manner by a parking brake.

Figure 7:
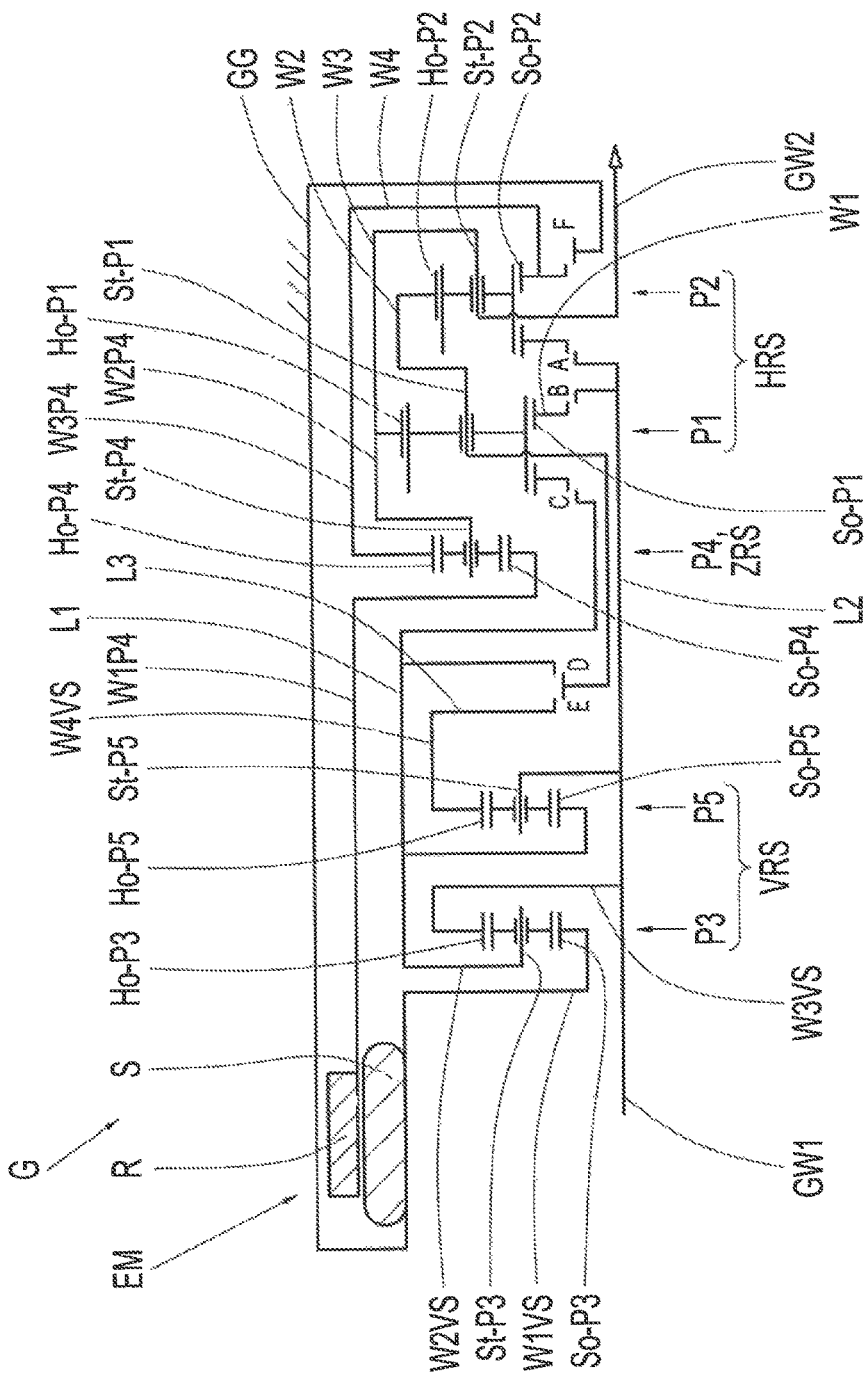
FIG. 7 schematically shows a transmission in accordance with a third exemplary embodiment of the invention.

FIG. 7 schematically shows a transmission G in accordance with a third exemplary embodiment of the invention. The upstream gear set VRS features four shafts W1VS, W2VS, W3VS and W4VS designated as the first, second, third and fourth shafts. The first power path L1 leads through the second shaft W2VS of the upstream gear set VRS, which is connected to the carrier St-P3 of the first planetary gear set P3 of the upstream gear set VRS. The sun gear So-P3 of the first planetary gear set P3 of the upstream gear set VRS is a component of the first shaft W1VS of the upstream gear set VRS and is fixed in a torque-proof manner, while the ring gear Ho-P3 of the first planetary gear set P3 of the upstream gear set VRS is connected to the transmission input shaft GW1. The third shaft W3VS of the upstream gear set VRS is connected to the transmission input shaft GW1, and is also a component of the second power path L2. A third power path L3 is led through the fourth shaft W4VS of the upstream gear set VRS, whereas a ring gear Ho-P5 of the second planetary gear set P5 of the upstream gear set VRS is a component of the fourth shaft W4VS of the upstream gear set VRS. A carrier St-R5 of the second planetary gear set P4 of the upstream gear set VRS is thereby connected to the transmission input shaft GW1. A sun gear So-P5 of the second planetary gear set P5 of the upstream gear set VRS is thereby connected to the second shaft W2VS of the upstream gear set VRS. The first power path L1 is connectable through the fourth shift element D to the second shaft W2 of the main gear set HRS and through the fifth shift element C to the first shaft W1 of the main gear set HRS. The second power path L2 is connectable through the first shift element A to the fourth shaft W4 of the main gear set HRS and through the third shift element B to the first shaft W1 of the main gear set HRS. The third power path L3 is connectable through the second shift element to the second shaft W2 of the main gear set HRS. Through the sixth shift element F, the fourth shaft W4 of the main gear set HRS can be fixed in a torque-proof manner.

In the third exemplary embodiment in accordance with FIG. 7, the main gear set HRS is structured in the following manner: the first shaft W1 of the main gear set HRS is connected to the sun gear So-P1 of the first planetary gear set P1 of the main gear set HRS. The second shaft W2 of the main gear set HRS is connected to the carrier St-P1 of the first planetary gear set P1 and to the ring gear Ho-P2 of the second planetary gear set P2 of the main gear set HRS. The third shaft W3 of the main gear set HRS is connected to the carrier St-P2 of the second planetary gear set P2 and to the ring gear Ho-P1 of the first planetary gear set P1 of the main gear set HRS. The fourth shaft W4 of the main gear set HRS is connected to the sun gear So-P2 of the second planetary gear set P2 of the main gear set HRS. The sun gears So-P1 and So-P2 of the two planetary gear sets P1, P2 of the main gear set are designed in two parts, whereas the connection of the parts of the sun gears So-P1 and So-P2 is identical to the connection in the second exemplary embodiment.

In the third exemplary embodiment as well, the transmission G features an electric motor EM, whereas the stator S is connected in a torque-proof manner to the transmission housing GG of the transmission G or to another torque-proof component of the transmission G, such that the stator S cannot assume any rotational speed. The rotatably mounted rotor R is connected to the sun gear So-P4 of the planetary gear set P4 of the auxiliary gear set ZRS. The sun gear So-P4 of the planetary gear set P4 of the auxiliary gear set ZRS is thereby a component of the first shaft W1P4 of the auxiliary gear set ZRS. The carrier St-P4 of the planetary gear set P4 of the auxiliary gear set ZRS is a component of the second shaft W2P4 of the auxiliary gear set ZRS, and is connected to the third shaft W3 of the main gear set HRS. The ring gear Ho-P4 of the planetary gear set P4 of the auxiliary gear set ZRS is a component of the third shaft W3P4 of the auxiliary gear set ZRS, and is connected to the fourth shaft W4 of the main gear set HRS.

Accordingly, in the third exemplary embodiment shown in FIG. 7, the first shaft W1P4 of the auxiliary gear set ZRS is connected to the rotor R, while the second shaft W2P4 of the auxiliary gear set ZRS is connected to the third shaft W3 of the main gear set HRS. The third shaft W3P4 of the auxiliary gear set ZRS is connected to the fourth shaft W4 of the main gear set HRS. Alternatively, the second shaft W2P4 of the auxiliary gear set ZRS could also be connected to, instead of the third shaft W3, the second shaft W2 of the main gear set HRS. In accordance with an additional alternative, the third shaft W3P4 of the auxiliary gear set ZRS could be connected to the third shaft W3 of the main gear set HRS, whereas, in this case, the second shaft W2P4 of the auxiliary gear set ZRS is connected to the second shaft W2 of the main gear set HRS. The stationary transmission ratios of the participating planetary gear sets are to be adjusted accordingly. For reasons of clarity, such alternatives of the second exemplary embodiment are not shown in separate figures.

Figure 8:
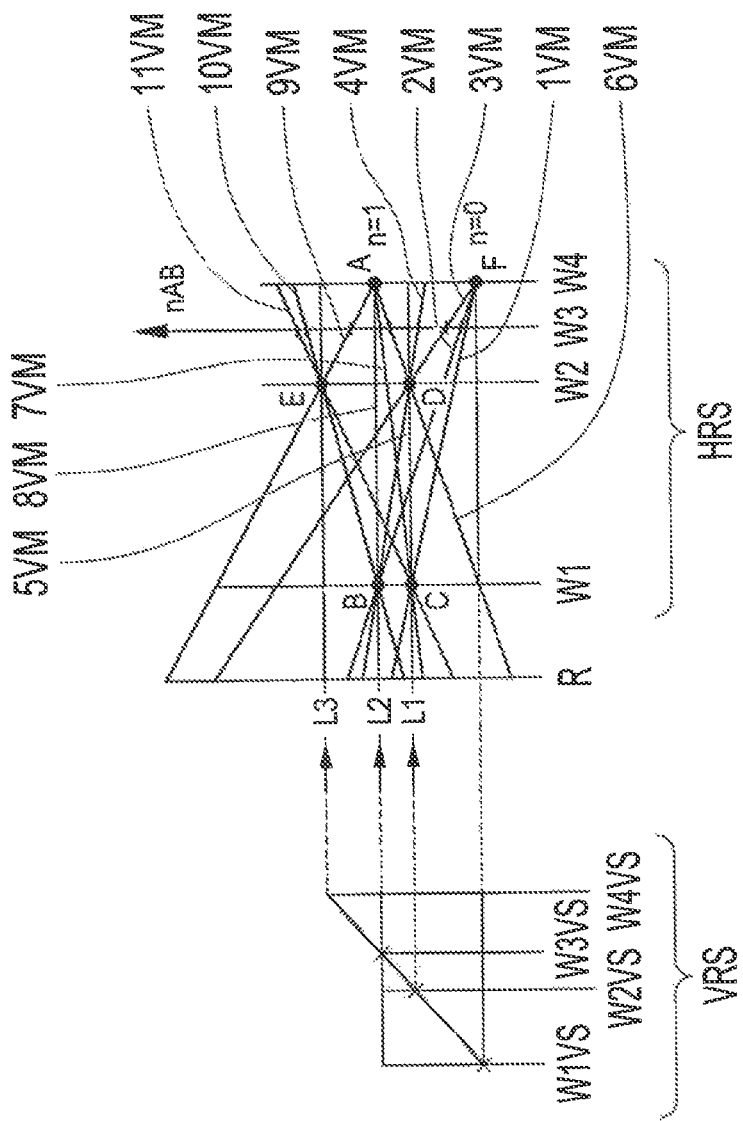
FIG. 8 shows a rotational speed diagram of the transmission in accordance with the third exemplary embodiment.

FIG. 8 shows a rotational speed plan of the third exemplary embodiment of the transmission G. The manner of presentation is identical to the presentation of the first and second exemplary embodiments. The shifting diagram in FIG. 6 also applies to the third exemplary embodiment of the transmission G.

Through the shifting diagram in FIG. 6 and the rotational speed diagram in FIG. 8, the operation of the third exemplary embodiment of the transmission G becomes clear. The transmission ratios arise from the stationary transmission ratios of the planetary gear sets P1, P2, P3, P4, P5. In the version shown as an example, the transmission G in such a way has a spread of 11.0.

Figure 9:
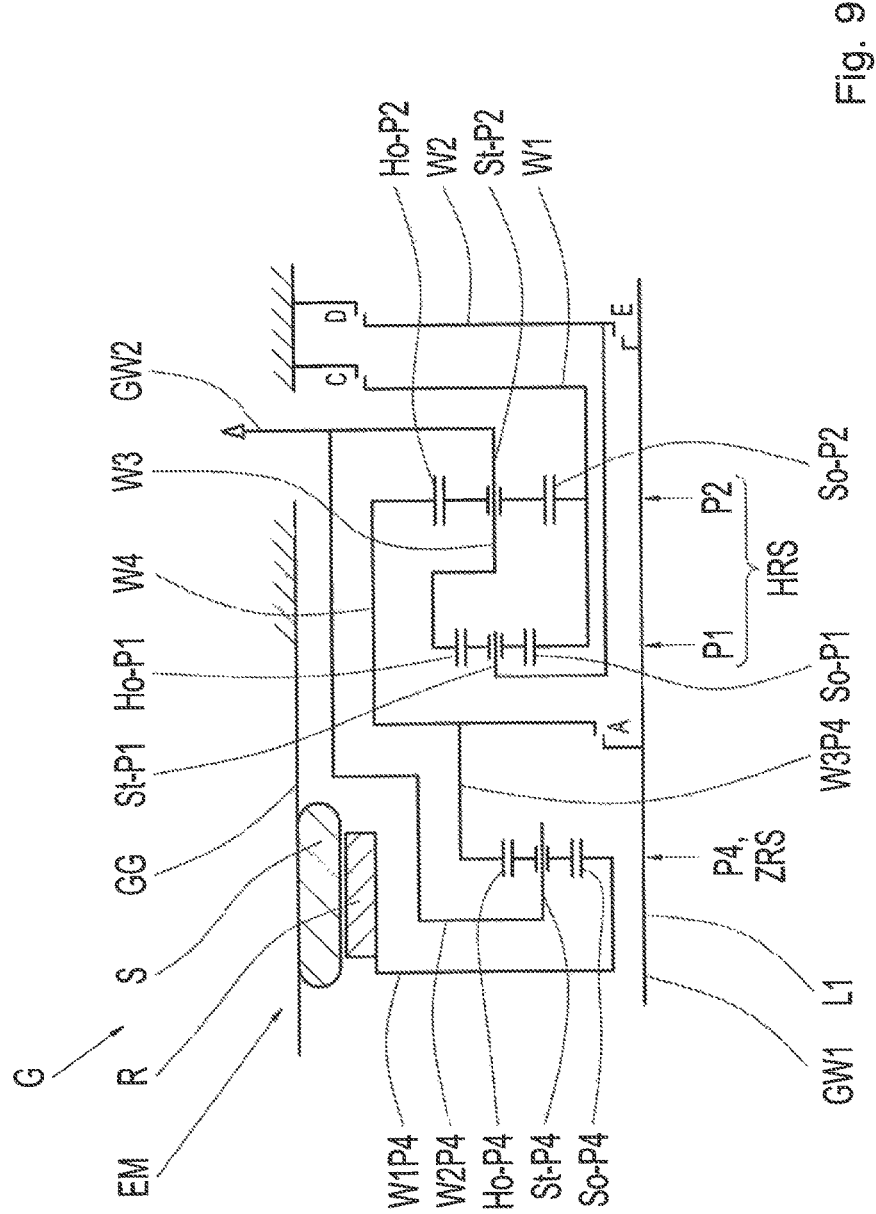
FIG. 9 schematically shows a transmission in accordance with a fourth exemplary embodiment of the invention.

FIG. 9 schematically shows a transmission G in accordance with a fourth exemplary embodiment of the invention. In this fourth exemplary embodiment, no upstream gear set VRS is provided. Accordingly, the transmission input shaft is connectable GW1 to the main gear set HRS only through a first power path L1. For this purpose, the transmission input shaft GW1 is connectable through the first shift element A to the fourth shaft W4 of the main gear set HRS and through the second shift element E to the second shaft W2 of the main gear set HRS. Through the fifth shift element C, the first shaft W1 of the main gear set HRS is fixed in a torque-proof manner. Through the fourth shift element D, the second shaft W2 of the main gear set HRS is fixed in a torque-proof manner. The first and second planetary gear sets P1, P2 of the main gear set HRS along with the planetary gear set P4 of the auxiliary gear set ZRS are formed as negative gear sets.

The first shaft W1 of the main gear set HRS is connected to the sun gears So-P1, So-P2 of the first and second planetary gear sets P1, P2 of the main gear set HRS. The second shaft W2 of the main gear set HRS is connected to the carrier St-P1 of the first planetary gear set P1 of the main gear set HRS. The third shaft W3 of the main gear set HRS is connected to the ring gear Ho-P1 of the first planetary gear set P1 and to the carrier St-P2 of the second planetary gear set P2 of the main gear set HRS. The third shaft W3 of the main gear set HRS is also connected to the transmission output shaft GW2. The fourth shaft W4 of the main gear set HRS is connected to the ring gear Ho-P2 of the second planetary gear set P2 of the main gear set HRS.

The sun gear So-P4 of the planetary gear set P4 of the auxiliary gear set ZRS is a component of the first shaft W1P4 of the auxiliary gear set ZRS, and is connected to the rotor R of the electric machine EM. The stator S of the electric motor EM is connected to the housing GG of the transmission G and is thus fixed in a torque-proof manner. The carrier St-P4 of the planetary gear set P4 of the auxiliary gear set ZRS is a component of the second shaft W2P4 of the auxiliary gear set ZRS, and is connected to the third shaft W3 of the main gear set HRS. The ring gear Ho-P4 is a component of the third shaft W3P4 of the auxiliary gear set ZRS and is connected to the fourth shaft W4 of the main gear set HRS.

Accordingly, in the fourth exemplary embodiment shown in FIG. 9, the first shaft W1P4 of the auxiliary gear set ZRS is connected to the rotor R, while the second shaft W2P4 of the auxiliary gear set ZRS is connected to the third shaft W3 of the main gear set HRS. The third shaft W3P4 of the auxiliary gear set ZRS is connected to the fourth shaft W4 of the main gear set HRS. Alternatively, the second shaft W2P4 of the auxiliary gear set ZRS could be connected to, instead of the third shaft W3, the second shaft W2 of the main gear set HRS. In this case, the third shaft W3P4 of the auxiliary gear set ZRS could be connected to, instead of the fourth shaft W4, the third shaft W3 of the main gear set HRS. The stationary transmission ratios of the participating planetary gear sets are to be adjusted accordingly. For reasons of clarity, such alternatives of the fourth exemplary embodiment are not shown in separate figures.

Figure 10:
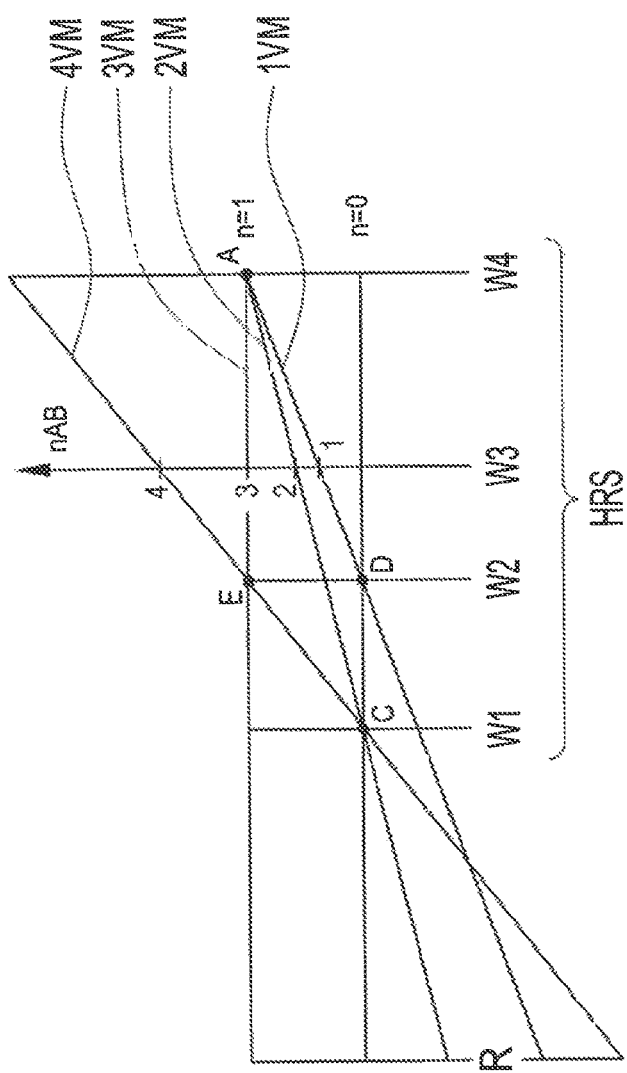
FIG. 10 shows a rotational speed diagram of the transmission in accordance with the fourth exemplary embodiment.

FIG. 10 shows a rotational speed plan in accordance with the fourth exemplary embodiment of the transmission G. The manner of presentation of the rotational speed plan is identical to the presentation of the first exemplary embodiment in FIG. 2.

FIG. 11 shows a shifting diagram of the transmission G in accordance with the fourth exemplary embodiment. Through the rotational speed diagram in FIG. 10 and the shifting diagram in FIG. 11, the operation of the fourth exemplary embodiment of the transmission G becomes clear. The locked shift elements A, C, D, E are indicated by circles in FIG. 11. By way of example, the respective transmission ratios of the individual gear steps and the gear jumps to the next higher gear to be determined from them may be taken from the shifting diagram, whereas the transmission G in such a way has a spread of 9.6. The transmission ratios arise from the stationary transmission ratios of the planetary gear sets P1, P2, P4. Upon a sequential shifting operation, double gearshifts and group gearshifts can be avoided, since two adjacent gear steps jointly use one shift element. The gears of the transmission G are shown in the various lines of the shifting diagram. One column of the shifting diagram further indicates whether the electric motor EM in the relevant gear is able to deliver mechanical power to the transmission output shaft GW2, or receive mechanical power from it.

A first reverse gear 1VM between the transmission input shaft GW1 and the transmission output shaft GW2 arises from the locking of the first shift element A and the fourth shift element D, a second reverse gear 2VM arises from the locking of the first shift element A and the fifth shift element C, a third reverse gear 3VM arises from the locking of the first shift element A and the second shift element E, and a fourth reverse 4VM arises from the locking of the fifth shift element C and the second shift element E.

In an electric gear 1EM, torque is transferred to transmission output shaft GW2 solely by the electric motor EM, whereas all shift elements except for the fourth shift element D are open, and there is thus no torque-transferring connection between the transmission input shaft GW1 and the transmission output shaft GW2. The electrical gear 1EM also serves as a reverse gear, in which the electric motor EM is driven in such a manner that the rotor R assumes a negative rotational speed: that is, a reverse rotation. Thus, a separate reverse gear is not necessary.

In the first and second start modes 1S, 2S, the transmission input shaft GW1 is supplied with torque. In the first start mode 1S, the first shift element A and the fourth shift element D are locked, by which the second shaft W2 of the main gear set HRS is fixed in a torque-proof manner. If, in the first start mode 1S, torque is applied at the transmission output shaft GW2, power in such a way can be transferred from the transmission output shaft GW2 to the transmission input shaft GW1. The electric motor EM may also add power. With the use of the transmission G in a motor vehicle with an internal combustion engine VKM, the first start mode 1S can be used for the towed takeoff of the internal combustion engine VKM. In the second start mode 2S, all shift elements are open, except for the first shift element A. If a parking brake, which is connected to the transmission output shaft GW2, is applied, the third shaft W3 of the main gear set HRS is thereby fixed in a torque-proof manner. Through the electric motor EM, power may thus be transferred from the first shaft W1P4 of the auxiliary gear set ZRS to the transmission input shaft GW1, in order to, in such a way, start an internal combustion engine VKM connected to the transmission input shaft GW1.

Figure 12:
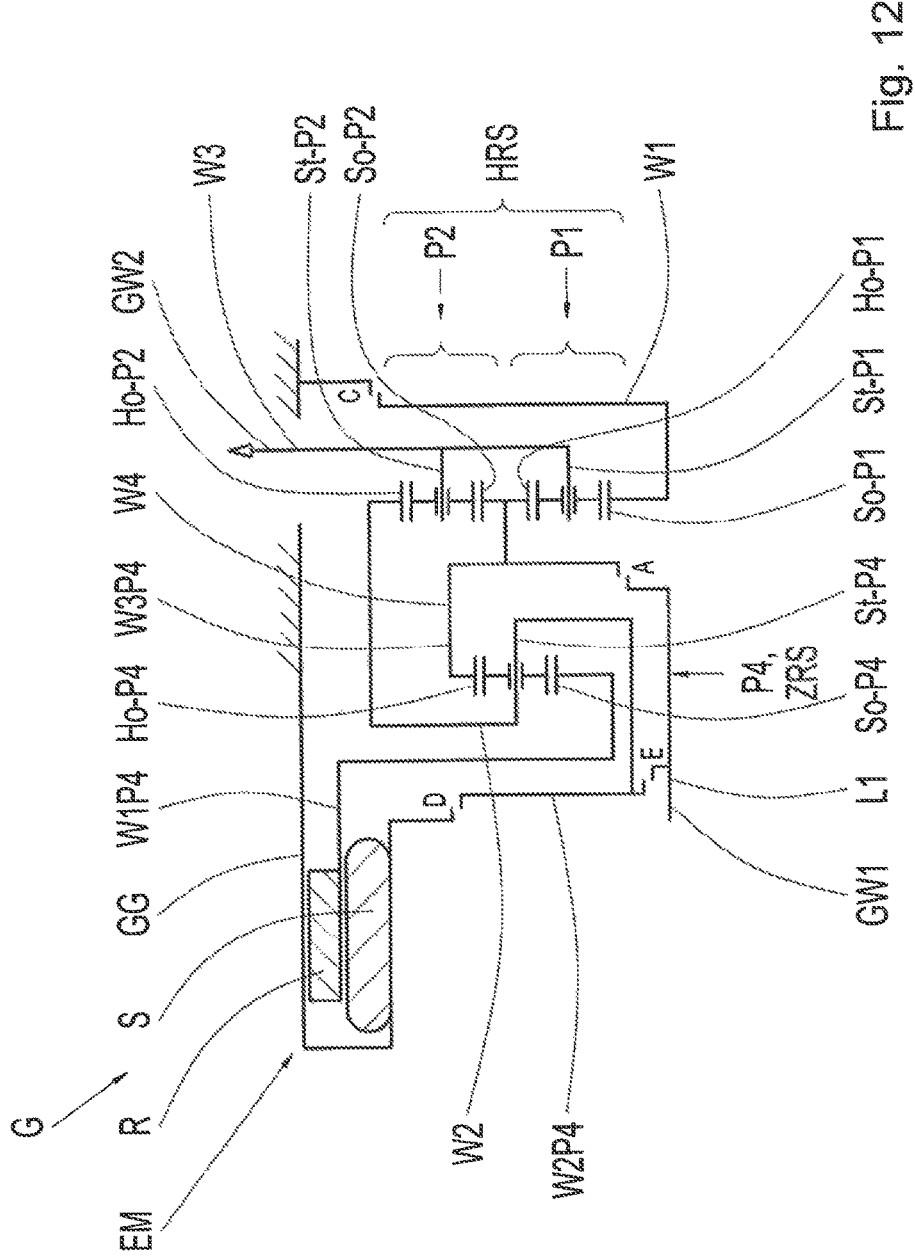
FIG. 12 schematically shows a transmission in accordance with a first variant of the fourth exemplary embodiment of the invention.

FIG. 12 schematically shows a variant of the fourth exemplary embodiment of the transmission G. This variant shows a special structure of the main gear set HRS, with which the two planetary gear sets P1, P2 are arranged on a common level. The two planetary gear sets P1, P2 of the main gear set HRS are thereby formed as negative gear sets. The sun gear So-P1 of the first planetary gear set P1 of the main gear set HRS is connected to the first shaft W1 of the main gear set HRS. The carriers St-P1, St-P2 of the planetary gear sets P1, P2 of the main gear set HRS are connected to each other, and are components of the third shaft W3 of the main gear set HRS, which is also connected to the transmission output shaft GW2. The ring gear Ho-P1 of the first planetary gear set P1 of the main gear set HRS directly forms the sun gear So-P2 of the second planetary gear set P2 of the main gear set HRS, and is a component of the fourth shaft W4 of the main gear set HRS. The ring gear Ho-P2 of the second planetary gear set P2 is a component of the second shaft W2 of the main gear set HRS.

The planetary gear set P4 of the auxiliary gear set ZRS is also formed as a negative gear set. The first shaft W1P4 of the auxiliary gear set ZRS is connected to the rotor R, whereas the sun gear So-P4 of the planetary gear set P4 of the auxiliary gear set ZRS is a component of the first shaft W1P4 of the auxiliary gear set ZRS. The second shaft W2P4 of the auxiliary gear set ZRS is connected to the second shaft W2 of the main gear set HRS, whereas the carrier St-P4 of the planetary gear set P4 of the auxiliary gear set ZRS is a component of the second shaft W2P4 of the auxiliary gear set ZRS. The third shaft W3P4 of the auxiliary gear set ZRS is connected to the fourth shaft W4 of the main gear set HRS, whereas the ring gear Ho-P4 of the planetary gear set P4 of the auxiliary gear set ZRS is connected to the third shaft W3P4 of the auxiliary gear set ZRS.

Accordingly, in the alternative of the fourth exemplary embodiment shown in FIG. 12, the first shaft W1P4 of the auxiliary gear set ZRS is connected to the rotor R, while the second shaft W2P4 of the auxiliary gear set ZRS is connected to the second shaft W2 of the main gear set HRS. The third shaft W3P4 of the auxiliary gear set ZRS is connected to the fourth shaft W4 of the main gear set HRS. Alternatively, the second shaft W2P4 of the auxiliary gear set ZRS could be connected to, instead of the second shaft W2, the third shaft W3 of the main gear set HRS. If the second shaft W2P4 of the auxiliary gear set ZRS is connected to the second shaft W2 of the main gear set HRS, the third shaft W3P4 of the auxiliary gear set ZRS could also be connected to the third shaft W3 of the main gear set HRS. The stationary transmission ratios of the participating planetary gear sets are to be adjusted accordingly. For reasons of clarity, such variants are not shown in separate figures.

The rotational speed diagram in FIG. 10 and the shifting diagram in FIG. 11 also apply in equal measure to the variant of the fourth exemplary embodiment of the transmission G shown in FIG. 12.

Figure 13:
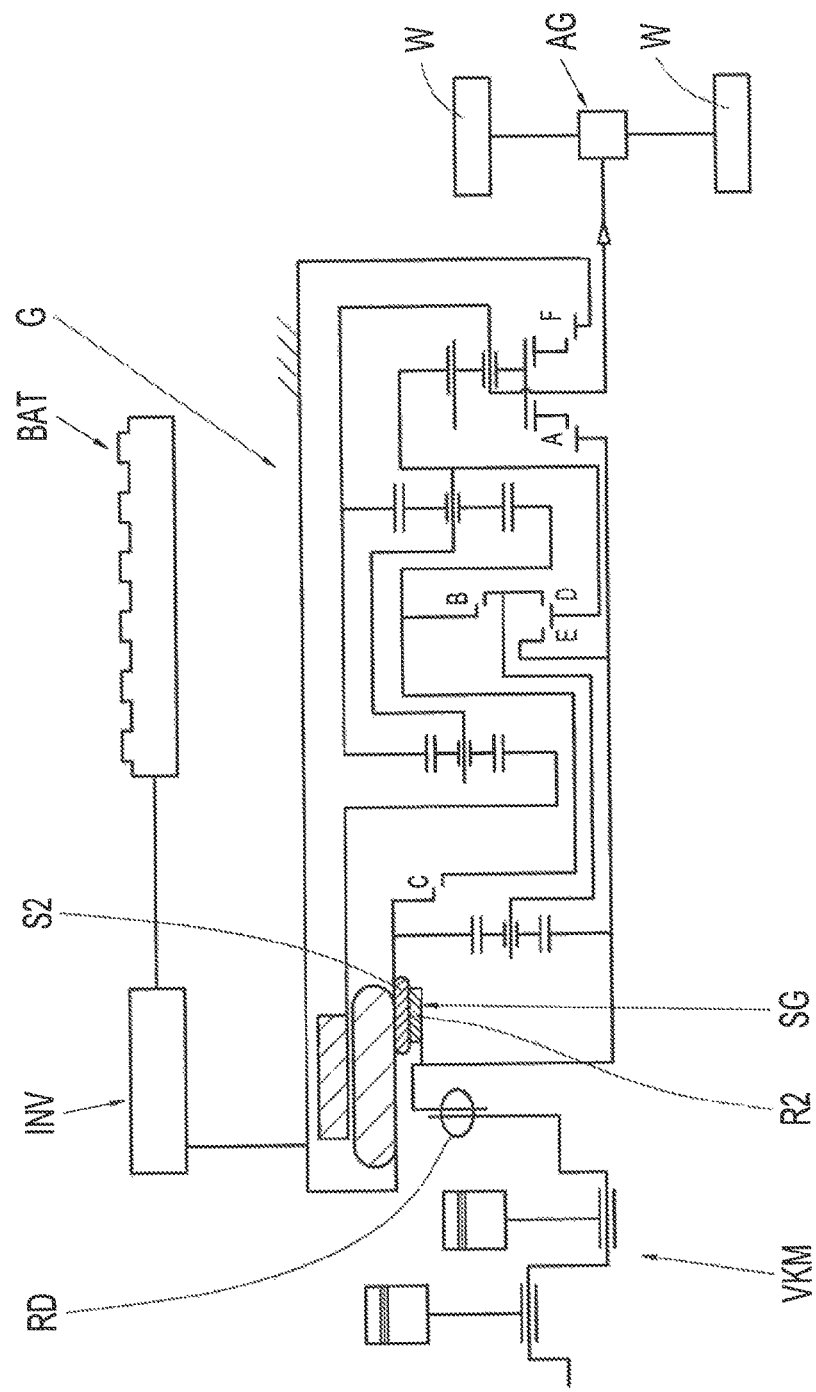
FIG. 13 shows a hybrid drive train of a motor vehicle.

FIG. 13 schematically shows a hybrid drive train of a motor vehicle. The transmission G contained therein corresponds to the first exemplary embodiment of the transmission G, whereas this is to be regarded merely as an example. Alternatively, the second, third or fourth exemplary embodiments of the transmission G, G, G form a component of the hybrid drive train. A rotatable rotor R2 of an auxiliary electric motor SG is connected to the transmission input shaft GW1, while the stator S2 of the auxiliary electric motor SG is fixed in a torque-proof manner to the transmission housing GG of the transmission G or to another torque-proof component of the transmission G. Through a rotational vibration damper RD, an internal combustion engine VKM is connected to the transmission input shaft GW1. The transmission output shaft GW2 is connected to an axle drive AG. Starting from the axle drive AG, the torque that applies at the transmission output shaft GW2 is distributed to wheels W of the motor vehicle. In generator mode of the electric motor EM, electric power is supplied to the stator S through a power inverter INV. In generator mode of the electric motor EM, the stator S supplies electric power to the power inverter INV. Thereby, the power inverter INV converts the DC voltage of a battery BAT into an AC voltage suitable for an electric motor EM, and vice versa. Thereby, the auxiliary electric motor SG may likewise be supplied with electric power through the power inverter INV. Alternatively, the auxiliary electric motor SG may also be connected to a different power supply, for example, to a low-voltage electrical system of the motor vehicle.

Modifications and variations can be made to the embodiments illustrated or described herein without departing from the scope and spirit of the invention as set forth in the appended claims.

REFERENCE SIGNS

G Transmission
GW1 Transmission input shaft
GW2 Transmission output shaft
HRS Main gear set
ZRS Auxiliary gear set
VRS Upstream gear set
EM Electric motor
R Rotor of the electric motor
S Stator of the electric motor
SG Auxiliary electric motor
R2 Rotor of the auxiliary electric motor
S2 Stator of the auxiliary electric motor
RD Rotational vibration damper
VKM Internal combustion engine
INV Power inverter
BAT Battery
P1 First planetary gear set of the main gear set
P2 Second planetary gear set of the main gear set
P3 First planetary gear set of the upstream gear set
P4 Planetary gear set of the auxiliary gear set
P5 Second planetary gear set of the upstream gear set
W1 First shaft of the main gear set
W2 Second shaft of the main gear set
W3 Third shaft of the main gear set
W4 Fourth shaft of the main gear set
W1VS First shaft of the upstream gear set
W2VS Second shaft of the upstream gear set
W3VS Third shaft of the upstream gear set
W4VS Fourth shaft of the upstream gear set
W1P4 First shaft of the auxiliary gear set
W2P4 Second shaft of the auxiliary gear set
W3P4 Third shaft of the auxiliary gear set
A First shift element
E Second shift element
B Third shift element
D Fourth shift element
C Fifth shift element
F Sixth shift element
So-P1 Sun gear of the first planetary gear set of the main gear set
St-P1 Carrier of the first planetary gear set of the main gear set
Ho-P1 Ring gear of the first planetary gear set of the main gear set
So-P2 Sun gear of the second planetary gear set of the main gear set
St-P2 Carrier of the second planetary gear set of the main gear set
Ho-P2 Ring gear of the second planetary gear set of the main gear set
So-P3 Sun gear of the first planetary gear set of the upstream gear set
St-P3 Carrier of the first planetary gear set of the upstream gear set
Ho-P3 Ring gear of the second planetary gear set of the upstream gear set
So-P4 Sun gear of the planetary gear set of the auxiliary gear set
St-P4 Carrier of the planetary gear set of the auxiliary gear set
Ho-P4 Ring gear of the planetary gear set of the auxiliary gear set
So-P5 Sun gear of the second planetary gear set of the upstream gear set
St-P5 Carrier of the second planetary gear set of the upstream gear set
Ho-P5 Ring gear of the second planetary gear set of the upstream gear set
L1 First power path
L2 Second power path
L3 Third power path
1VM-11VM First to eleventh forward gears
1EM Electric gear
1S First start mode
2S Second start mode
AG Axle drive
W Wheel

The invention claimed is:

1. A transmission, comprising:
a transmission input shaft;
a transmission output shaft;
a main gear set, at least one power path formed between the transmission input shaft and the main gear set, the main gear set comprising a first planetary gear set, a second planetary gear set and four shafts;
at least one shift element, the at least one power path connectable through the at least one shift element to at least one of the four shafts of the main gear set, a third shaft of the main gear set connected to the transmission output shaft, an auxiliary gear set, the auxiliary gear set comprising a planetary gear set and three shafts; and an electric motor having a rotor and a stator, a first shaft of the auxiliary gear set connected to the rotor, wherein a second shaft of the auxiliary gear set is constantly connected to a second shaft the main gear set or to the third shaft of the main gear set, wherein, when the second shaft of the main gear set is constantly connected to the second shaft of the auxiliary gear set, the third shaft of the main gear set or a fourth shaft of the main gear set is constantly connected to a third shaft of the auxiliary gear set, and wherein, when the third shaft of the main gear set is constantly connected to the second shaft of the auxiliary gear set, the fourth shaft of the main gear set is constantly connected to the third shaft of the auxiliary gear set.

2. The transmission of claim 1, wherein stationary transmission ratios of the planetary gear set of the auxiliary gear set and of the first and second planetary gear sets of the main gear set are selected such that a first shaft of the main gear set is located between the first shaft of the auxiliary gear set and the second shaft of the main gear set in a rotational speed diagram.

3. The transmission of claim 1, wherein:

a sun gear of the planetary gear set of the auxiliary gear set is a component of the first shaft of the auxiliary gear set;

when the planetary gear set of the auxiliary gear set is a negative gear set, a carrier of the planetary gear set of the auxiliary gear set is a component of the second shaft of the auxiliary gear set, and a ring gear of the planetary gear set of the auxiliary gear set is a component of the third shaft of the auxiliary gear set, and when the planetary gear set of the auxiliary gear set is formed as a positive gear set, the ring gear of the planetary gear set of the auxiliary gear set is a component of the second shaft of the auxiliary gear set, and the carrier of the planetary gear set of the auxiliary gear set is a component of the third shaft of the auxiliary gear set.

4. The transmission of claim 1, wherein:

a sun gear of the planetary gear set of the auxiliary gear set is a component of the third shaft of the auxiliary gear set;

when the planetary gear set of the auxiliary gear set is a negative gear set, a carrier of the planetary gear set of the auxiliary gear set is a component of the second shaft of the auxiliary gear set, and a ring gear of the planetary gear set of the auxiliary gear set is a component of the first shaft of the auxiliary gear set; and when the planetary gear set of the auxiliary gear set is a positive gear set, the ring gear of the planetary gear set of the auxiliary gear set is a component of the second shaft of the auxiliary gear set, and the carrier of the planetary gear set of the auxiliary gear set is a component of the first shaft of the auxiliary gear set.

5. The transmission of claim 1, wherein:

the planetary gear set of the auxiliary gear set and the first and second planetary gear sets of the main gear set are negative gear sets;

a sun gear of the planetary gear set of the auxiliary gear set is a component of the first shaft of the auxiliary gear set and is connected to the rotor;

a carrier of the planetary gear set of the auxiliary gear set is connected to a carrier of the first planetary gear set of the main gear set and to a ring gear of the second planetary gear set of the main gear set such that the carrier of the planetary gear set of the auxiliary gear set is a component of the second shaft of the auxiliary gear set and the second shaft of the main gear set;

a ring gear of the planetary gear set of the auxiliary gear set is connected to a ring gear of the first planetary gear set of the main gear set and to a carrier of the second planetary gear set of the main gear set such that the ring gear of the planetary gear set of the auxiliary gear set is a component of the third shaft of the auxiliary gear set, the third shaft of the main gear set and the transmission output shaft;

a sun gear of the first planetary gear set of the main gear set is a component of a first shaft of the main gear set; and a sun gear of the second planetary gear set of the main gear set is a component of the fourth shaft of the main gear set.

6. The transmission of claim 1, wherein:

the planetary gear set of the auxiliary gear set and the first and second planetary gear sets of the main gear set are negative gear sets;

a sun gear of the planetary gear set of the auxiliary gear set is a component of the first shaft of the auxiliary gear set and is connected to the rotor;

a carrier of the planetary gear set of the auxiliary gear set is connected to a carrier of the first planetary gear set of the main gear set and to a ring gear of the second planetary gear set of the main gear set such that the carrier of the planetary gear set of the auxiliary gear set is a component of the second shaft of the auxiliary gear set and the second shaft of the main gear set;

a ring gear of the planetary gear set of the auxiliary gear set is connected to a ring gear of the first planetary gear set of the main gear set and to a sun gear of the second planetary gear set of the main gear set such that the ring gear of the planetary gear set of the auxiliary gear set is a component of the third shaft of the auxiliary gear set and the fourth shaft of the main gear set;

a carrier of the second planetary gear set of the main gear set is a component of the third shaft of the main gear set and the transmission output shaft; and a sun gear of the first planetary gear set of the main gear set is a component of a first shaft of the main gear set.

7. The transmission of claim 1, wherein:

the planetary gear set of the auxiliary gear set and the first and second planetary gear sets of the main gear set are negative gear sets;

a sun gear of the planetary gear set of the auxiliary gear set is a component of the first shaft of the auxiliary gear set and is connected to the rotor;

a carrier of the planetary gear set of the auxiliary gear set is connected to a ring gear of the first planetary gear set of the main gear set and to a carrier of the second planetary gear set of the main gear set such that the carrier of the planetary gear set of the auxiliary gear set is a component of the second shaft of the auxiliary gear set, the third shaft of the main gear set and the transmission output shaft;

a ring gear of the planetary gear set of the auxiliary gear set is connected to a sun gear of the second planetary gear set of the main gear set such that the ring gear of the planetary gear set of the auxiliary gear set is a component of the third shaft of the auxiliary gear set and the fourth shaft of the main gear set;

a sun gear of the first planetary gear set of the main gear set is a component of a first shaft of the main gear set; and a carrier of the first planetary gear set of the main gear set is connected to a ring gear of the second planetary gear set of the main gear set such that the carrier of the first planetary gear set of the main gear set is a component of the second shaft of the main gear set.

8. The transmission of claim 1, wherein:

the planetary gear set of the auxiliary gear set and the first and second planetary gear sets of the main gear set are formed as negative gear sets;

a sun gear of the planetary gear set of the auxiliary gear set is a component of the first shaft of the auxiliary gear set and is connected to the rotor;

a carrier of the planetary gear set of the auxiliary gear set is connected to a ring gear of the first planetary gear set of the main gear set and to a carrier of the second planetary gear set of the main gear set such that the carrier of the planetary gear set of the auxiliary gear set is a component of the second shaft of the auxiliary gear set, the third shaft of the main gear set and the transmission output shaft;

a ring gear of the planetary gear set of the auxiliary gear set is connected to a ring gear of the second planetary gear set of the main gear set such that the ring gear of the planetary gear set of the auxiliary gear set is a component of the third shaft of the auxiliary gear set and the fourth shaft of the main gear set;

sun gears of the first and second planetary gear sets of the main gear set are connected such that the sun gears of the first and second planetary gear sets of the main gear set are components of a first shaft of the main gear set; and a carrier of the first planetary gear set of the main gear set is a component of the second shaft of the main gear set.

9. The transmission of claim 1, wherein:

the planetary gear set of the auxiliary gear set and the first and second planetary gear sets of the main gear set are negative gear sets;

a sun gear of the planetary gear set of the auxiliary gear set is a component of the first shaft of the auxiliary gear set and is connected to the rotor;

a carrier of the planetary gear set of the auxiliary gear set is connected to a ring gear of the second shaft of the main gear set such that the carrier of the planetary gear set of the auxiliary gear set is a component of the second shaft of the auxiliary gear set and the second shaft of the main gear set;

a ring gear of the planetary gear set of the auxiliary gear set is connected to a ring gear of the first planetary gear set of the main gear set and to a sun gear of the second planetary gear set of the main gear set such that the ring gear of the planetary gear set of the auxiliary gear set is a component of the third shaft of the auxiliary gear set and the fourth shaft of the main gear set;

a sun gear of the first planetary gear set of the main gear set is a component of a first shaft of the main gear set; and carriers of the first and second planetary gear sets are connected to each other such that the carriers of the first and second planetary gear sets are components of the third shaft of the main gear set and the transmission output shaft.

10. The transmission of claim 1, wherein the first and second planetary gear sets of the main gear set are negative gear sets, a first shaft of the main gear set is connected to a sun gear of the first planetary gear set of the main gear set, the second shaft of the main gear set is connected to a carrier of the first planetary gear set and to a ring gear of the second planetary gear set of the main gear set, the third shaft of the main gear set is connected to a ring gear of the first planetary gear set and to a carrier of the second planetary gear set of the main gear set, and the fourth shaft of the main gear set is connected to a sun gear of the second planetary gear set of the main gear set.

11. The transmission of claim 1, wherein the first and second planetary gear sets of the main gear set are negative gear sets, a first shaft of the main gear set is connected to a sun gear of the first planetary gear set of the main gear set, the second shaft of the main gear set is connected to a carrier of the first planetary gear set of the main gear set and to a ring gear of the second planetary gear set of the main gear set, the third shaft of the main gear set is connected to a carrier of the second planetary gear set of the main gear set, and the fourth shaft of the main gear set is connected to a sun gear of the second planetary gear set of the main gear set.

12. The transmission of claim 1, wherein the first planetary gear set of the main gear set is a negative gear set and the second planetary gear set of the main gear set is a positive gear set, a first shaft of the main gear set is connected to a sun gear of the first planetary gear set of the main gear set, the second shaft of the main gear set is connected to a carrier of the first planetary gear set of the main gear set and to a carrier of the second planetary gear set of the main gear set, the third shaft of the main gear set is connected to a ring gear of the first planetary gear set of the main gear set and to a ring gear of the second planetary gear set of the main gear set, and the fourth shaft of the main gear set is connected to a sun gear of the second planetary gear set of the main gear set.

13. The transmission of claim 1, wherein the first and second planetary gear sets of the main gear set are negative gear sets, a first shaft of the main gear set is connected to a sun gear of the first planetary gear set of the main gear set and to a sun gear of the second planetary gear set of the main gear set, the second shaft of the main gear set is connected to a carrier of the first planetary gear set of the main gear set, the third shaft of the main gear set is connected to a ring gear of the first planetary gear set and to a carrier of the second planetary gear set of the main gear set, and the fourth shaft of the main gear set is connected to a ring gear of the second planetary gear set of the main gear set.

14. A hybrid drive train for a motor vehicle, comprising at least one internal combustion engine and the transmission of claim 1.

15. The hybrid drive train of claim 14, further comprising at least one auxiliary electric motor connected to the internal combustion engine directly or through the transmission, the at least one auxiliary electric motor configured to start the internal combustion engine, the rotor of the auxiliary electric motor connected to the transmission input shaft of the transmission.

16. A drive train for an electric vehicle, comprising the transmission of claim 1.

* * * * *